United States Patent
Kang et al.

(10) Patent No.: US 10,993,152 B2
(45) Date of Patent: Apr. 27, 2021

(54) APPARATUS AND METHOD FOR SUPPORTING HANDOVER WITH MULTI-CONNECTIVITY IN WIRELESS COMMUNICATION SYSTEM

(71) Applicant: Samsung Electronics Co., Ltd., Suwon-si (KR)

(72) Inventors: Hyun-Jeong Kang, Seoul (KR); Sang-Wook Kwon, Suwon-si (KR); Kyung-Kyu Kim, Suwon-si (KR); Young-Joong Mok, Suwon-si (KR); Sang-Kyu Baek, Yongin-si (KR); Anil Agiwal, Suwon-si (KR); Young-Bin Chang, Anyang-si (KR); June Hwang, Incheon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/742,440

(22) Filed: Jan. 14, 2020

(65) Prior Publication Data

US 2020/0154321 A1    May 14, 2020

Related U.S. Application Data

(63) Continuation of application No. 15/243,348, filed on Aug. 22, 2016, now Pat. No. 10,542,469.

(30) Foreign Application Priority Data

Aug. 21, 2015 (IN) .......................... 4378/CHE/2015
Aug. 21, 2015 (IN) .......................... 4402/CHE/2015
Mar. 31, 2016 (IN) .......................... 201641011346

(51) Int. Cl.
    *H04W 36/00* (2009.01)
(52) U.S. Cl.
    CPC ... *H04W 36/0058* (2018.08); *H04W 36/0069* (2018.08); *Y02D 30/70* (2020.08)
(58) Field of Classification Search
    CPC ......... H04W 36/0061; H04W 36/0094; H04W 36/0072; H04W 36/0066; H04W 88/06
    USPC .......................... 455/436–439; 370/331–332
    See application file for complete search history.

(56) References Cited

U.S. PATENT DOCUMENTS

| | | | |
|---|---|---|---|
| 9,924,419 B2 * | 3/2018 | Moon | H04W 76/18 |
| 2011/0310852 A1 | 12/2011 | Dimou et al. | |
| 2014/0038598 A1 | 2/2014 | Ren et al. | |
| 2014/0092785 A1 | 4/2014 | Song et al. | |

(Continued)

*Primary Examiner* — CongVan Tran
(74) *Attorney, Agent, or Firm* — Jefferson IP Law, LLP

(57) ABSTRACT

The present disclosure relates to $5^{th}$ generation (5G) or pre-5G communication systems for supporting higher data transfer rates, following the $4^{th}$ generation (4G) communication systems, such as long term evolution (LTE). A method for supporting handover with multi-connectivity in a wireless communication system is provided. The method includes sending a measurement report message including information of at least one small base station (eNB) to a macro cell eNB, receiving information of a new small eNB in a target cell from the macro cell eNB based on the measurement report message, and performing a random access procedure with the new small eNB in the target cell based on handover.

10 Claims, 30 Drawing Sheets

(56) References Cited

U.S. PATENT DOCUMENTS

| | | |
|---|---|---|
| 2014/0099955 A1* | 4/2014 | Nukala ................ H04W 36/36 455/436 |
| 2014/0192672 A1 | 7/2014 | Seo et al. |
| 2014/0241281 A1 | 8/2014 | Wu |
| 2014/0357275 A1* | 12/2014 | Quan ............. H04W 36/00835 455/436 |
| 2015/0003310 A1 | 1/2015 | Ko et al. |
| 2015/0141015 A1 | 5/2015 | Zhang et al. |
| 2015/0148050 A1 | 5/2015 | Siomina et al. |
| 2015/0172987 A1 | 6/2015 | Balakrishnan et al. |
| 2015/0264621 A1 | 9/2015 | Sivanesan et al. |
| 2015/0350969 A1 | 12/2015 | Dudda et al. |
| 2015/0365872 A1 | 12/2015 | Dudda et al. |
| 2015/0373599 A1* | 12/2015 | Kim ................. H04W 36/0085 370/331 |
| 2016/0014666 A1* | 1/2016 | Muller ............. H04W 36/0088 455/436 |
| 2016/0174124 A1 | 6/2016 | Basu Mallick et al. |
| 2016/0270141 A1 | 9/2016 | Sharma et al. |
| 2016/0302117 A1 | 10/2016 | Inoue et al. |
| 2016/0373990 A1 | 12/2016 | Lim et al. |
| 2016/0381610 A1* | 12/2016 | Pu .................... H04W 36/0094 455/436 |
| 2017/0019819 A1 | 1/2017 | Yang et al. |
| 2017/0034767 A1 | 2/2017 | Griot et al. |
| 2018/0220342 A1 | 8/2018 | Farooqi et al. |

\* cited by examiner

APPARATUS AND METHOD FOR SUPPORTING HANDOVER WITH MULTI-CONNECTIVITY IN WIRELESS COMMUNICATION SYSTEM

CROSS-REFERENCE TO RELATED APPLICATION(S)

This application is a continuation application of prior application Ser. No. 15/243,348, filed on Aug. 22, 2016, which was based on and claimed priority under 35 U.S.C. § 119(a) of an Indian Provisional patent application filed on Aug. 21, 2015 in the Indian Intellectual Property Office and assigned Serial number 4378/CHE/2015, of an Indian Provisional patent application filed on Aug. 21, 2015 in the Indian Intellectual Property Office and assigned Serial number 4402/CHE/2015, and of an Indian Provisional patent application filed on Mar. 31, 2016 in the Indian Intellectual Property Office and assigned Serial number 201641011346, the disclosure of each of which is incorporated by reference herein in its entirety.

TECHNICAL FIELD

The present disclosure relates to an apparatus and method for supporting handover with multi-connectivity in wireless communication systems.

BACKGROUND

To meet the demand for wireless data traffic having increased since deployment of 4th-generation (4G) communication systems, efforts have been made to develop an improved 5th-generation (5G) or pre-5G communication system. Therefore, the 5G or pre-5G communication system is also called a 'beyond 4G network' or a 'post long term evolution (LTE) system'.

The 5G communication system is considered to be implemented in higher frequency (mmWave) bands, e.g., 28 GHz, 39 GHz, or 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying (FSK) and quadrature amplitude modulation (QAM) modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In the meantime, high data rate service can be supported by cooperation of multiple base stations (BSs), for example, dual connectivity between macro cell BS (MeNB) and small cell BS (SeNB) or between small cell BSs or between macro cell BSs. Existing dual connectivity scheme is hard to support ultra-high data rate service since addition of new small cell BS operated in high frequency bands (e.g., >4 GHz or >3.5 GHz) causes on-going data degradation. More severe service degradation is experienced in case of radio link failure at small cell BS operated in high frequency bands (e.g., >4 GHz or >3.5 GHz). Such BS cooperation schemes should be enhanced for continuous ultra-high data rate service or ultra-low latency service which requires high speed mobility and/or ultra-high data rate and/or fast recovery from sudden signal drop and/or fast recovery from radio link failure.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for supporting continuous ultra-high rate data services that require fast recovery in case of radio link failure in a small cell base station (BS).

Another aspect of the present disclosure is to provide an apparatus and method for supporting multi-connectivity using multiple small cells.

In accordance with an aspect of the present disclosure, a method for supporting handover with multi-connectivity in a wireless communication system is provided. The method includes sending a measurement report message including information of at least one small base station (eNB) to a macro cell eNB, receiving information of a new small eNB in a target cell from the macro cell eNB based on the measurement report message, and performing a random access procedure with the new small eNB in the target cell based on handover.

In accordance with another aspect of the present disclosure, an apparatus for supporting handover with multi-connectivity in a wireless communication system is provided. The apparatus includes a transmitter for sending a measurement report message including information of at least one small eNB to a macro cell eNB, a receiver for receiving information of a new small eNB in a target cell from the macro cell eNB based on the measurement report message, and a controller for performing a random access procedure with the new small eNB in the target cell based on handover.

In accordance with another aspect of the present disclosure, a method for supporting handover with multi-connectivity in a wireless communication system is provided. The method includes receiving a measurement report message including information of at least one small eNB from a user equipment (UE), and sending information of a new small eNB in a target cell to the UE based on the measurement report message, wherein a random access procedure is performed based on handover between the UE and the new small eNB in the target cell.

In accordance with another aspect of the present disclosure, an apparatus for supporting handover with multi-connectivity in a wireless communication system is provided. The apparatus includes a receiver for receiving a measurement report message including information of at least one small eNB from a UE, and a transmitter for sending information of a new small eNB in a target cell to the UE based on the measurement report message, wherein a random access procedure is performed based on handover between the UE and the new small eNB in the target cell.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 20 presents macro cell base station (MeNB) initiated SeNB selection with sequential attachment according to an embodiment of the present disclosure;

FIG. 21 presents user equipment (UE) initiated SeNB selection with simultaneous attachment according to an embodiment of the present disclosure;

FIG. 22 presents UE initiated SeNB selection with sequential attachment according to an embodiment of the present disclosure;

FIG. 23 presents MeNB initiated multiple primary cell (PCell) set configuration, according to an embodiment of the present disclosure;

FIG. 24 presents MeNB initiated multiple primary secondary cell (PSCell) set configuration according to an embodiment of the present disclosure;

FIG. 25 presents MeNB initiated multiple PCell set configuration during SeNB change according to an embodiment of the present disclosure;

FIG. 26 presents MeNB initiated multiple PCell set and PSCell set configuration during MeNB change according to an embodiment of the present disclosure;

Throughout the drawings, like reference numerals will be understood to refer to like parts, components, and structures.

DETAILED DESCRIPTION

Figure 1:
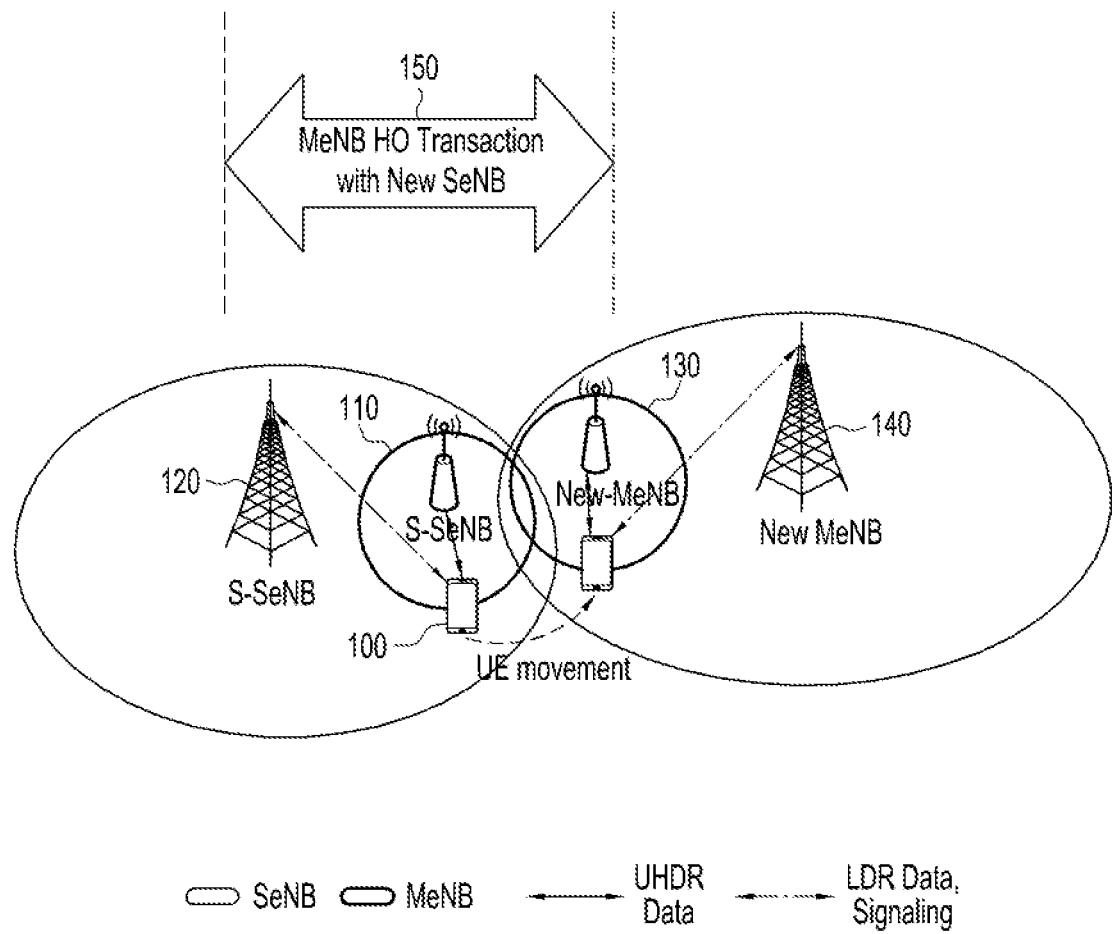
FIG. 1 is a block diagram of a wireless communication system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

User equipment (UE) or communication terminal is an entity for communicating with a base station or other terminals and may also be referred to as node, UE, mobile station (MS), mobile equipment (ME), device, terminal, etc. Hereinafter, a value of TTT in FIGS. 2, 3, 5, 6, 7, 9, 10, 11, 12, 13, 14, 16, 17, 18, 19, 20, 21, 22, 23, 24, 25, and 26, is set to '0' or more.

Hereinafter, macro cell base station (BS) and macro cell BS (MeNB) are interchangeably used, and small cell BS and small cell BS (SeNB) are also interchangeably used. It should be noted that the interchangeably used terms have the same meaning. In this disclosure, small cell BS operates on long term evolution (LTE) frequency or mmWave frequency or higher frequency than LTE or lower frequency than LTE. Small cell BS operates in licensed band or unlicensed band. Small cell BS can be a base station with cellular technology or LTE technology or Wi-Fi technology or WiGig technology. Small cell BS has the same capacity as macro cell BS but small cell BS performs some part of normal base station functions (e.g., no radio resource control (RRC) function, user packet transmission and reception) as SeNB according to this disclosure. As another example small cell BS has less capacity than macro cell BS; small cell BS is a transmission point, or small cell BS has layer 1 functions only, or small cell BS has layer 1 and MAC sub-layer functions only etc. As one example, small cell BS has connection to a gateway (e.g., S-GW). In other example small cell BS does not have connection to a gateway (e.g., S-GW) and is connected to a gateway through macro cell BS.

In this disclosure, macro cell BS indicates a base station which operates in current LTE system.

A metric to perform new SeNB addition during MeNB handover is signal quality of SeNB of Target MeNB. A metric to perform new SeNB addition during MeNB handover is available resource at SeNB with which UE get continuous ultra-high data rate packet transmission/reception at Target MeNB. A metric to perform new SeNB selection is signal quality of SeNB or available resource at SeNB with which UE get continuous ultra-high data rate packet transmission/reception when UE is connected to the new SeNB.

FIG. 1 is a block diagram of a wireless communication system according to an embodiment of the present disclosure.

Referring to FIG. 1, UE 100 is simultaneously or sequentially served by small cell BS (SeNB) 110 as well as macro cell BS (MeNB) 120, where MeNB 120 refers to Serving-MeNB (S-MeNB) and SeNB 110 refers to Serving-SeNB (S-SeNB).

In an embodiment, in dual connectivity the two BSs may transmit/receive packets to/from UE. The packets served with the two BSs can be from the same data bearer or different data bearers. UE 100 gets measurement configuration information including a metric from S-MeNB 120 and performs measurement on other BSs (other MeNBs and other SeNBs). Metric and measurement may be applied to at least one of beam index used/measured between UE 100 and S-MeNB 120, between UE 100 and S-SeNB 110, between UE 100 and other MeNB(s) 140, between UE 100 and other SeNB(s) 130. A metric applied to SeNB 110 for SeNB addition can be different that for MeNB 120. UE 100 reports measurement result of SeNB(s) 110 as well as MeNB(s) 120, where an identifier of SeNB(s) and/or beam state information, beam index are reported. Based on a measurement result of UE 100 the S-MeNB 120 may select other SeNB which can serve UE as new SeNB 140 under the S-MeNB. Once an event when S-SeNB cannot serve UE (e.g., a signal quality of S-SeNB drops below a certain threshold 1) happens the newly selected SeNB may become new S-SeNB for UE.

In another embodiment, based on a measurement result of UE 100 the S-MeNB 120 may select candidate new MeNB where UE 100 performs handover according to a predefined event condition (e.g., a signal quality of S-MeNB drops below a certain threshold 2). During UE's handover transaction 150 between S-MeNB and candidate new MeNB the S-MeNB may share UE's measurement result of SeNB(s) under the new MeNB. UE's measurement result of SeNB(s) may include at least one of measured signal quality, measured beam state information, beam index. With the measurement result the new MeNB may select new SeNB which can serve UE 100 with the new MeNB. The selected new SeNB of new MeNB may be informed to UE through S-MeNB during UE's 100 handover transaction. Dedicated random access resource at the selected new SeNB or the selected new MeNB can be provided for UE 100 based on beam state information, beam index measured by UE 100. UE context maintenance at the selected new SeNB 130 or the selected new MeNB 140 can be provided for UE 100, where UE context may be kept after UE access to the selected new MeNB 140 or the selected new SeNB 130. Once completing connection reconfiguration procedure with the new MeNB, UE 100 may resume packet transmission/reception with the new MeNB 140 and the new SeNB 130.

Figure 2:
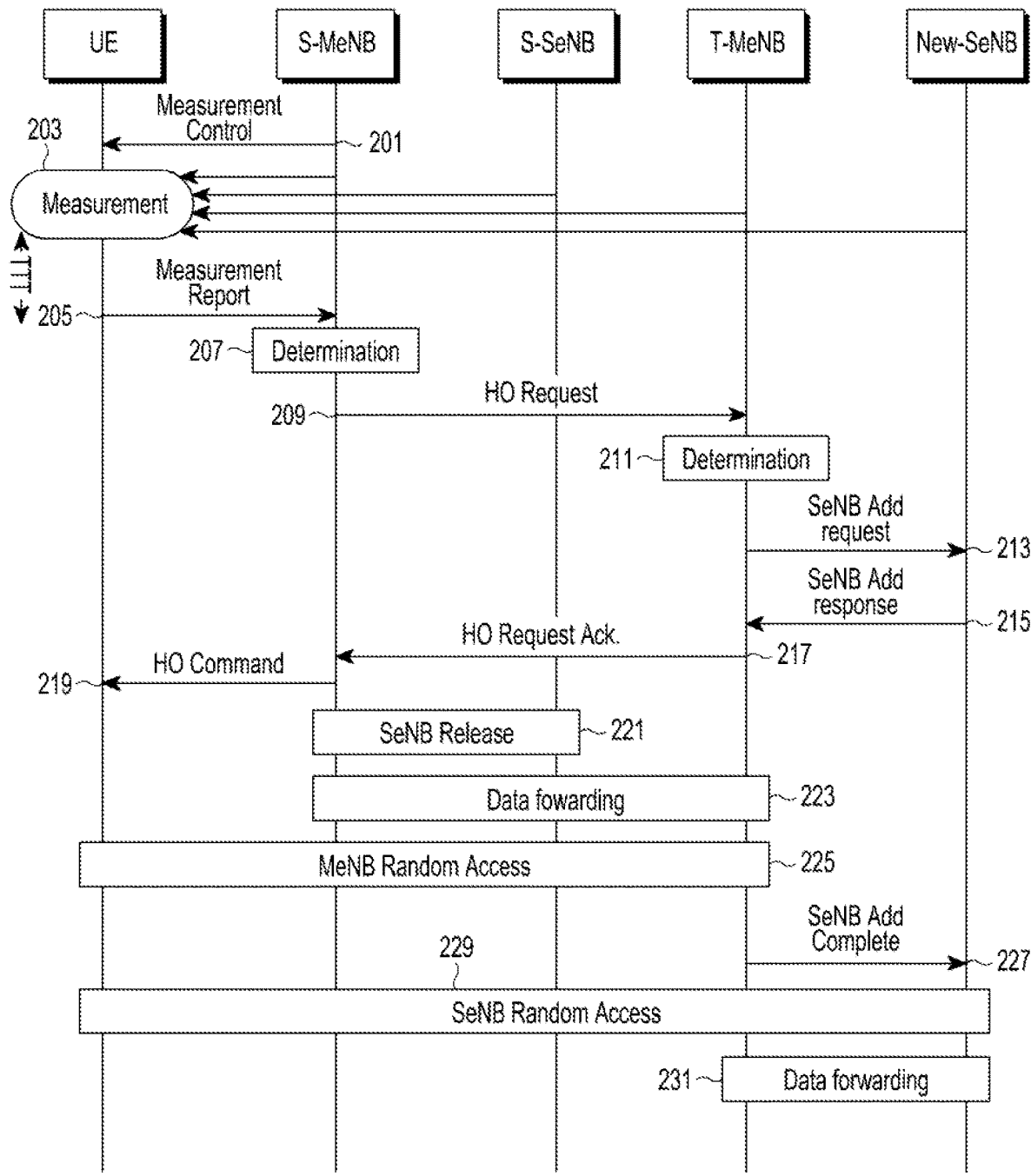
FIG. 2 is a flowchart illustrating a procedure of supporting handover with multi-connectivity in a wireless communication system according to a first embodiment of the present disclosure.

FIG. 2 is a flowchart illustrating a procedure of supporting handover with multi-connectivity in a wireless communication system according to a first embodiment of the present disclosure.

Referring to FIG. 2, in operation 201, S-MeNB transmits measurement control message to UE where the measurement control message includes measurement control information, which may include at least one of other MeNB information, SeNB information for example, center frequency, primary cell identification (PCell ID), BS ID, measurement event condition, measurement report event condition, etc. Measurement event condition and/or measurement report event condition for SeNB addition can be different from that for MeNB handover. According to measurement control information UE measures MeNBs as well as SeNB periodically or event-based, in operation 203. UE reports its measurement result to S-MeNB, in operation 205. The measurement result may include at least one of SeNBs' signal quality under S-MeNB, other MeNBs' signal quality, or SeNBs' signal quality under other MeNBs or beam state information, beam index. Based on the measurement result S-MeNB determines whether UE needs to perform handover to another MeNB, in operation 207. If UE's handover is required then S-MeNB transmits HO request message to candidate new MeNB, in operation 209. The HO request message may include at least one of UE's measurement result of SeNBs under the candidate new MeNB including beam state information, beam index for SeNBs as well as UE's information. If candidate new MeNB accepts UE's handover to itself then the candidate new MeNB selects SeNB for the UE, in operation 211. The candidate new MeNB transmits SeNB Add request message to the selected SeNB, in operation 213. The SeNB responds with SeNB Add response message to the candidate new MeNB, in operation 215. The candidate new MeNB transmits HO request ack message to the S-MeNB, in operation 217, where at least one of UE's HO acceptance, SeNB information, RACH information may be included in the HO request ack message. RACH information at SeNB may be selected based on at least one of beam state information, beam index for SeNB. The S-MeNB transmits HO Command message to UE, in operation 219, where the information transmitted from the candidate new MeNB may be included in the HO Command message, e.g. at least one of MeNB information, SeNB information, RACH information etc.

The S-MeNB releases the connection between the S-MeNB and the S-SeNB in operation 221, after or at the same time it sends the HO Command message to the UE. The candidate new MeNB becomes target MeNB (T-MeNB). The S-MeNB communicates data with the T-MeNB, in operation 223. UE begins connection reconfiguration procedure with the T-MeNB in operations 221 and 223. In connection reconfiguration procedure, UE perform random access to T-MeNB, in operation 225. In an embodiment, UE may perform random access to new SeNB. The T-MeNB then sends an SeNB addition complete message to the new SeNB, in operation 227. In connection reconfiguration procedure of the UE, S-MeNB, S-SeNB, T-MeNB and new SeNB may perform path change procedures for UE through X2 interface or Si interface, as in operation 223. Furthermore, in connection reconfiguration procedure of the UE, an SeNB release procedure between S-MeNB and S-SeNB is performed as in operation 221. Specifically, in handover transaction and connection reconfiguration of the UE with the T-MeNB, the SeNB and T-MeNB may perform path setup and packet delivery procedures for continuity of services to the UE.

Pending UE's packets at S-MeNB and S-SeNB may be transferred to T-MeNB. In the connection reconfiguration procedure, the UE performs random access to the new SeNB, in operation 229, and data is forwarded in operation 231 as illustrated in FIG. 2.

Figure 3:
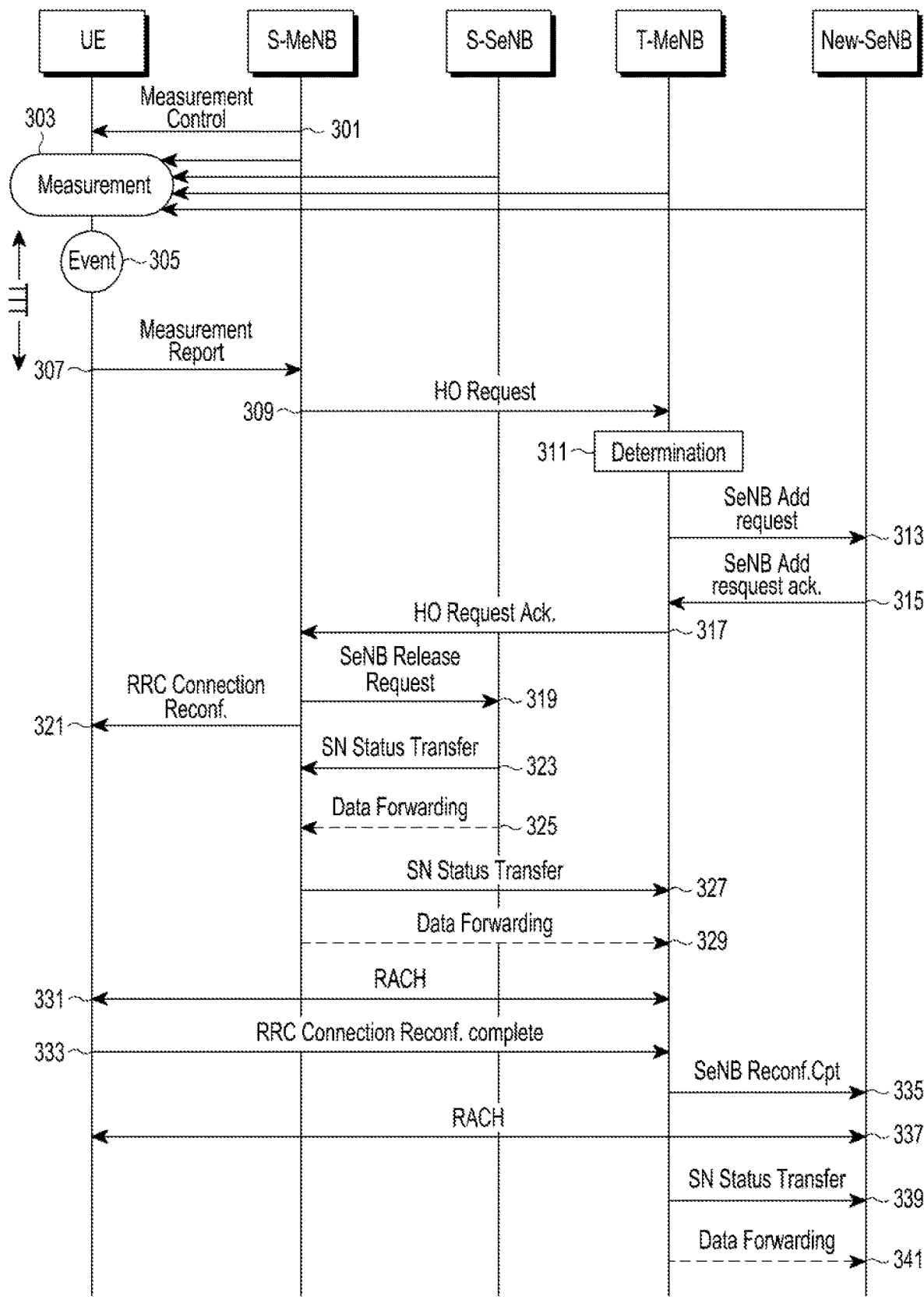
FIG. 3 is a flowchart illustrating a procedure of supporting handover with multi-connectivity in a wireless communication system according to a first embodiment of the present disclosure.

FIG. 3 is a flowchart illustrating a procedure of supporting handover with multi-connectivity in a wireless communication system according to a first embodiment of the present disclosure.

Referring to FIG. 3, S-MeNB transmits measurement control message to UE, in operation 301. Measurement control message includes measurement control information, which may include at least one of measurement control of candidate target MeNBs, candidate target SeNBs, measurement report triggering condition for MeNB as well as SeNB. Measurement event condition and/or measurement report event condition for SeNB addition can be different from that for MeNB handover. UE performs measurement according to the information of measurement control message, in operation 303. In operation 305, if an event indicated in measurement control message happens, then UE waits for the expiration of TTT (time-to-trigger). A value of TTT is set to '0' or more. The event of measurement report continues at the expiration of TTT in operation 307, then UE transmits measurement report message to S-MeNB. When the event requires measurement report of candidate target MeNB, UE reports SeNBs under candidate target MeNB (e.g., SeNB's center frequency and SeNB ID). The S-MeNB transmits HO request message to candidate target MeNB, in operation 309. The HO request message may include measurement result (e.g., at least one of RSRP, RSRQ, SINR, beam state information, and beam index) of SeNBs under candidate target MeNB, where the measurement is performed on beam index of SeNBs. The HO request message may include at least one candidate SeNB identifier under candidate target MeNB. Based on the SeNB information of HO request message, candidate target MeNB selects candidate SeNB for UE in operation 311 and sends SeNB add request message to the candidate SeNB in operation 313. The candidate SeNB responds with SeNB add request ack message, in operation 315. The SeNB add request ack message may include at least one of RACH information of SeNB, dedicated RACH preamble, beam-forming information (beam state information, beam index) of SeNB. The candidate target MeNB transmits HO request ack message to S-MeNB, in operation 317 and the HO request ack message may include at least one of RACH information of candidate target MeNB, RACH information of SeNB, dedicated RACH preamble at candidate target MeNB, dedicated RACH preamble at SeNB, beamforming information of SeNB.

Referring to FIG. 3, in operation 321, S-MeNB may transmit RRC Connection Reconfiguration message to UE to command UE to perform handover to the target MeNB. The RRC Connection Reconfiguration message may include at least one of RACH information of target MeNB, RACH information of SeNB, dedicated RACH preamble at target MeNB, dedicated RACH preamble at SeNB, beamforming information of SeNB. UE performs random access with the target MeNB using the information gotten in RRC Connection Reconfiguration message, in operation 331. UE completes random access with the target MeNB and transmits RRC Connection Reconfiguration complete message to the target MeNB in operation 333. UE performs random access with the new SeNB in operation 337 using the information gotten in RRC Connection Reconfiguration message. The UE can perform random access with T-MeNB and SeNB simultaneously.

While UE's handover transaction including connection reconfiguration with T-MeNB and random access with new SeNB, S-MeNB, S-SeNB, T-MeNB and new SeNB performs procedures which change path from S-MeNB and SeNB to T-MeNB and new SeNB in operations 319, 323, 325, 327, 329, 335, 339, and 341, forward pending UE packets from S-MeNB and SeNB to T-MeNB and new SeNB. In other words, during handover transaction and connection reconfiguration of the UE to the T-MeNB, the SeNB and T-MeNB may perform path setup and packet delivery procedures for continuity of services to the UE.

Figure 4A:
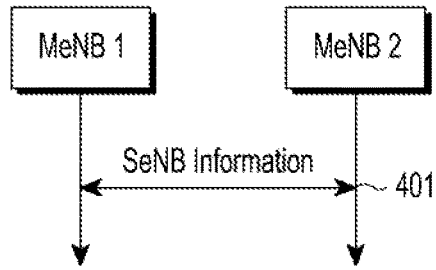
FIGS. 4A, 4B, and 4C illustrate how to obtain small cell base station (SeNB) information according to an embodiment of the present disclosure.
Figure 4B:
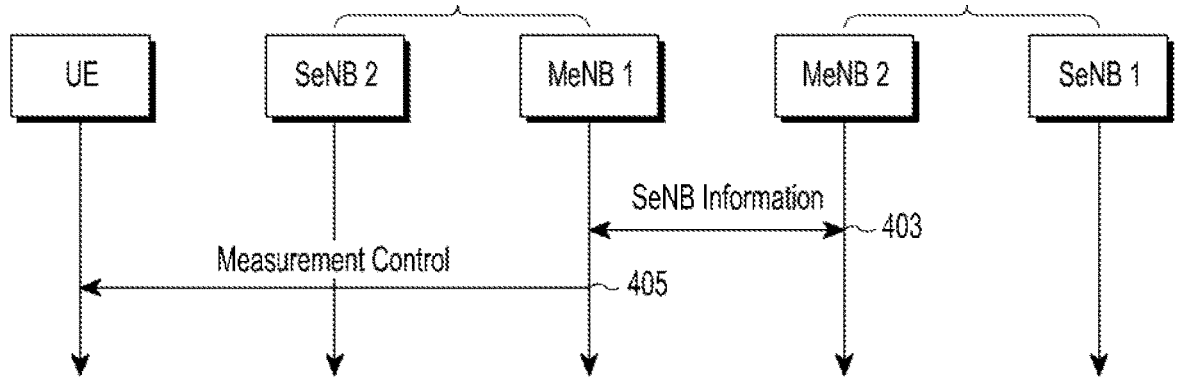
Figure 4C:
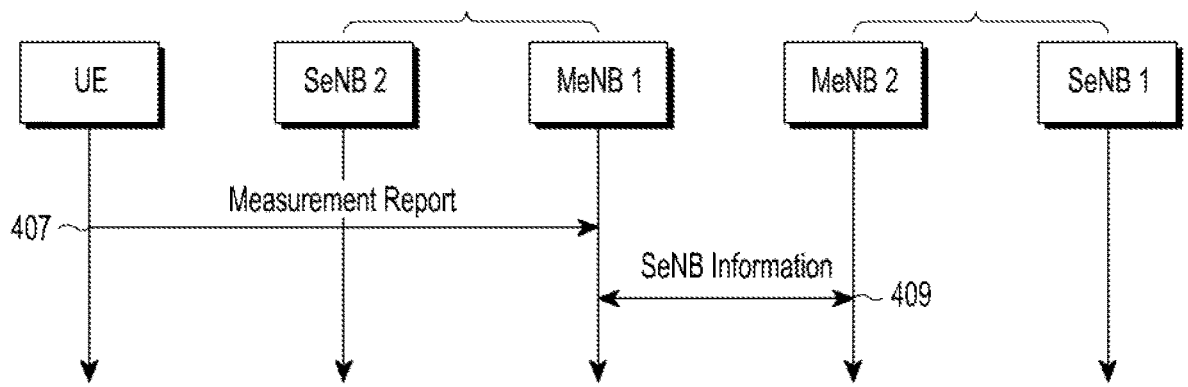

FIGS. 4A, 4B, and 4C illustrate how to obtain SeNB information according to an embodiment of the present disclosure.

Referring to FIG. 4A, as in operation 401, MeNBs exchanges its own SeNBs information. The SeNB information may include at least one of SeNB's center frequency, SeNB's ID (globally unique ID), SeNB's PCell ID, etc. This information is not shared with UE, so UE may not know which SeNB belongs to which MeNB.

Referring to FIG. 4B, as in operation 403, MeNBs (e.g., MeNB 1, MeNB 2) exchanges its own SeNBs information which is included in measurement control message to UE. The SeNB information may include at least one of SeNB's center frequency, SeNB's ID (globally unique ID), SeNB's PCell ID, etc. In operation 405, UE receives measurement control message generated in operation 403.

Referring to FIG. 4C, as in operation 407, UE sends measurement result message to a serving MeNB, where measurement result message may include at least one of SeNBs information and neighboring MeNBs information. The SeNB information may include at least one of SeNB's center frequency, SeNB's ID (globally unique ID), SeNB's PCell ID, SeNB's beam state information, beam index etc. After receiving measurement result, UE's MeNB exchanges the information of measurement result message with other MeNBs or central controller (e.g., MME), in operation 409. From this transaction MeNB knows which SeNB belong to which MeNB. In an embodiment, based on measurement result from UE, MeNB or SeNB store the relationship of beam state information, beam index and SeNB which is used for deciding SeNB to add.

Figure 5:
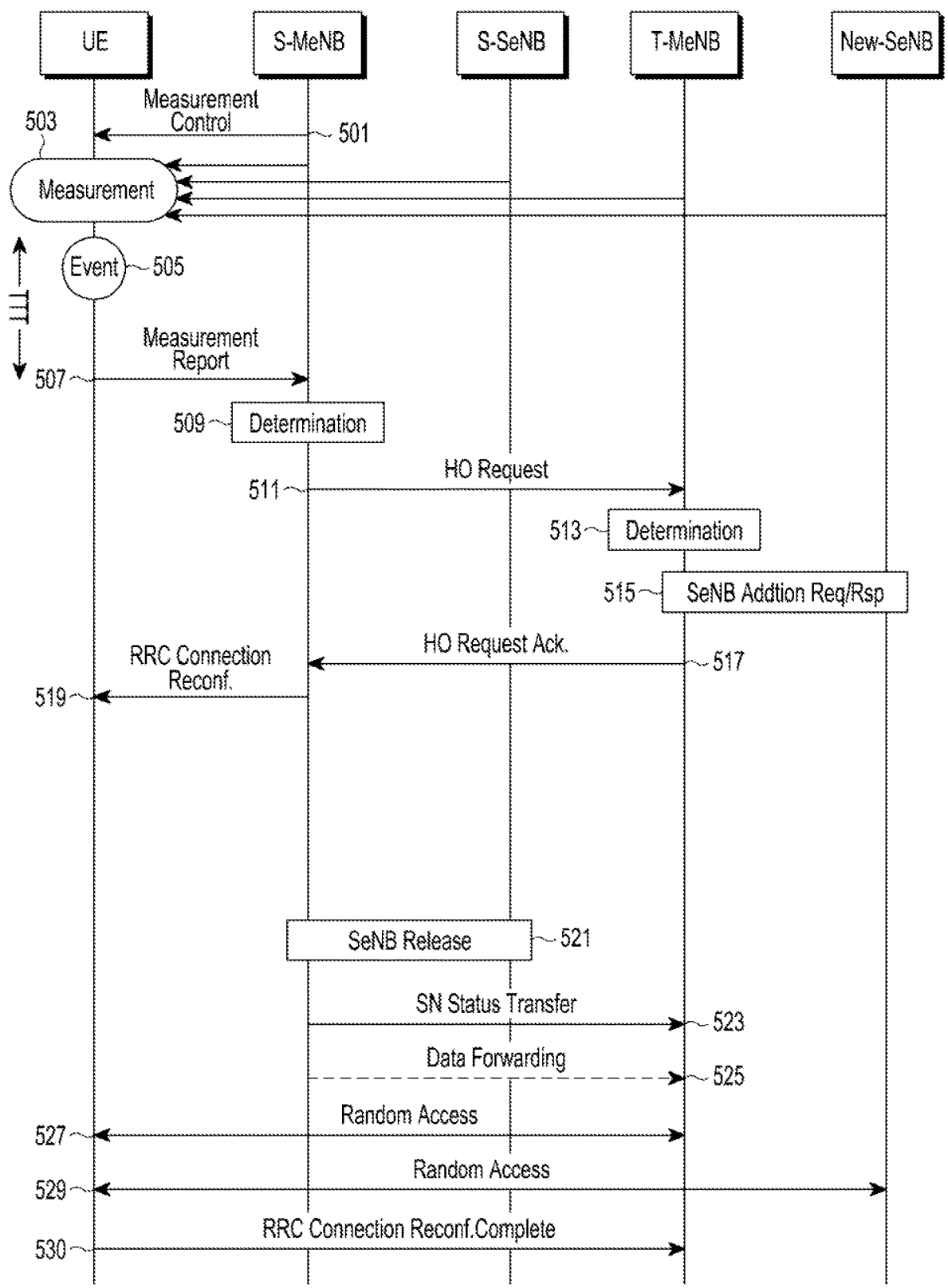
FIG. 5 is a flowchart illustrating a procedure of supporting handover with multi-connectivity in a wireless communication system according to an embodiment of the present disclosure.

FIG. 5 is a flowchart illustrating a procedure of supporting handover with multi-connectivity in a wireless communication system according to an embodiment of the present disclosure.

Referring to FIG. 5, in operation 501, S-MeNB transmits measurement control message to UE which includes at least one of candidate new MeNBs, candidate new SeNBs, measurement report control, measurement report triggering condition etc. Measurement report control or measurement report triggering condition for SeNB addition is different from those for MeNB handover. In operation 503, UE performs measurement based on the measurement control information of measurement control message. In operation 505, when an event is triggered according to the measurement control information, UE waits for an expiration of time-to-trigger (TTT) for MeNB handover. A value of TTT is set to '0' or more. In operation 507, UE transmits Measurement report message to S-MeNB. When S-MeNB determines UE's handover to candidate target MeNB based on the measurement report in operation 509, S-MeNB transmits HO request message to the candidate target MeNB in operation 511. The HO request message may include at least one of UE's information, UE's measurement result of SeNB and SeNBs under the MeNB. In operation 513, the candidate target MeNB selects candidate new SeNB based on the measurement result of SeNBs including at least one information of signal quality, beam state information, beam index, resource availability, stored information of the relationship between beam state information, beam index and SeNB. In operation 515, the candidate target MeNB and candidate new SeNB exchange SeNB addition request and SeNB addition response messages. The SeNB addition request and SeNB addition messages may include at least one of UE information, RACH information of SeNB, dedicated RACH preamble, beam-forming information (beam state information, beam index) of SeNB. In operation 517, the candidate target MeNB transmits HO request ack message to S-MeNB that includes the random access information for UE which performs handover to candidate target MeNB and new SeNB. Random access information at new SeNB may be determined based on UE's beam state information, beam index report for new SeNB. In operation 519, S-MeNB transmits RRC Connection Reconfiguration message to UE with the information of HO request ack message. Using the random access information of RRC Connection Reconfiguration message UE performs random access with T-MeNB and new SeNB, in operations 527, 529. After completing random access procedures with T-MeNB and new SeNB, in operation 530, UE transmits RRC Connection Reconfiguration Complete message to T-MeNB. In operations 521, 523, and 525, UE performing handover transaction with S-MeNB and random access procedures with T-MeNB and new SeNB, S-MeNB, S-SeNB, T-MeNB and new SeNB performs path change, pending packet forwarding procedures for UE. In other words, in handover transaction and connection reconfiguration of the UE to the T-MeNB, the SeNB and T-MeNB may perform path setup and packet delivery procedures for continuity of services to the UE.

Figure 6:
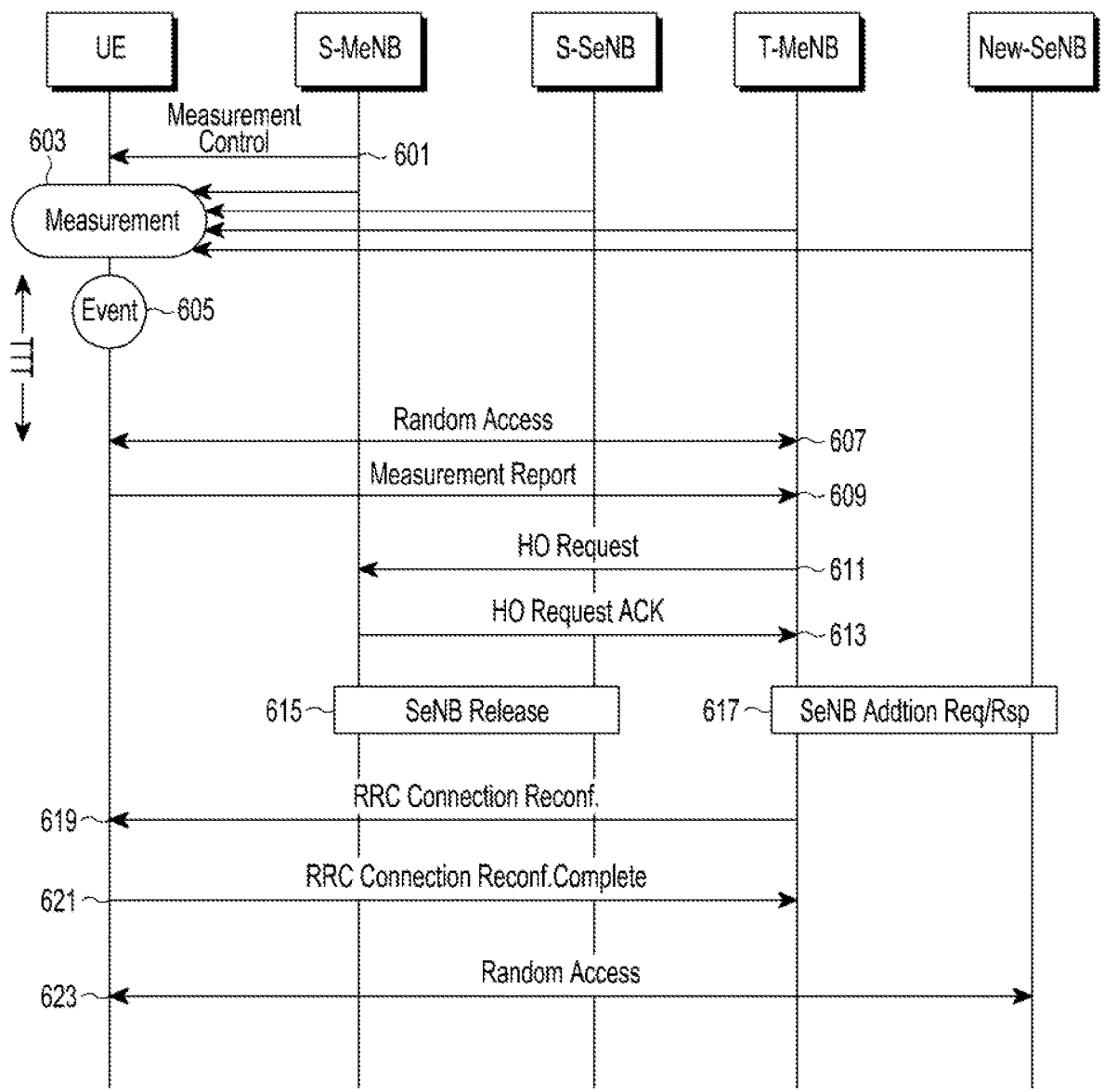
FIG. 6 is a flowchart illustrating a procedure of supporting handover with multi-connectivity in a wireless communication system according to a first embodiment of the present disclosure.

FIG. 6 is a flowchart illustrating a procedure of supporting handover with multi-connectivity in a wireless communication system according to a first embodiment of the present disclosure.

Referring to FIG. 6, in operation 601, S-MeNB transmits measurement control message to UE. Measurement control message includes at least one of measurement control of candidate target MeNBs, candidate target SeNBs, measurement report triggering condition for MeNB as well as SeNB. Measurement report control or measurement report triggering condition for SeNB addition is different from those for MeNB handover. In operation 603, UE performs measurement according to the information of measurement control message. In operation 605, if an event indicated in measurement control message happens, then UE waits for the expiration of TTT (time-to-trigger) of MeNB handover. A value of TTT is set to '0' or more. The event of measurement report to T-MeNB continues at the expiration of TTT, then UE transmits measurement report message to T-MeNB in operation 609. Before transmitting measurement report message, UE may perform random access with T-MeNB in operation 607. T-MeNB allocates UL grant for measurement report signaling when receiving random access from UE. The measurement report message uses predefined random access resource as an indication of MeNB handover to T-MeNB. UE transmits random access for measurement report instead of general random access, in order for T-MeNB to allocate required random access resources to the measurement report message. In an additional embodiment, the measurement report message may include measurement result (e.g., at least one or more of RSRP, RSRQ, SINR, beam state information, beam index) of SeNBs under T-MeNB. In another additional embodiment, the measurement report message may include candidate SeNB identifier under T-MeNB. In operation 611, the T-MeNB transmits HO request message to S-MeNB which indicates that UE will handover to T-MeNB. HO request message can include random access resource at T-MeNB and/or candidate SeNB. S-MeNB responds with HO Request ack message which includes UE's information. In operation 613, the HO request and HO request ack messages are used to fetch UE's context from S-MeNB to T-MeNB. When receiving HO request message, S-MeNB performs SeNB release procedure with S-SeNB in operation 615. In operation 619, T-MeNB performs SeNB addition procedure with new SeNB through SeNB addition request and SeNB addition response messages. In SeNB addition response message at least one of RACH information of new SeNB, dedicated RACH preamble of new SeNB may be included. In operation 619, T-MeNB transmits RRC Connection Reconfiguration message to UE which includes at least one or more of new SeNB information (center frequency, identifier), RACH information of new SeNB, beamforming information of new SeNB, dedicated RACH preamble of new SeNB. UE responds with RRC Connection Reconfiguration Complete message in operation 621, and performs random access procedure with new SeNB in operation 623. Although not shown, S-MeNB, S-SeNB, T-MeNB and new SeNB perform path change procedures, UE packet forwarding after HO request/HO request ack transaction between S-MeNB and T-MeNB. In operation 617, T-MeNB performs SeNB addition procedure with new SeNB through SeNB addition request and SeNB addition response messages.

Figure 7:
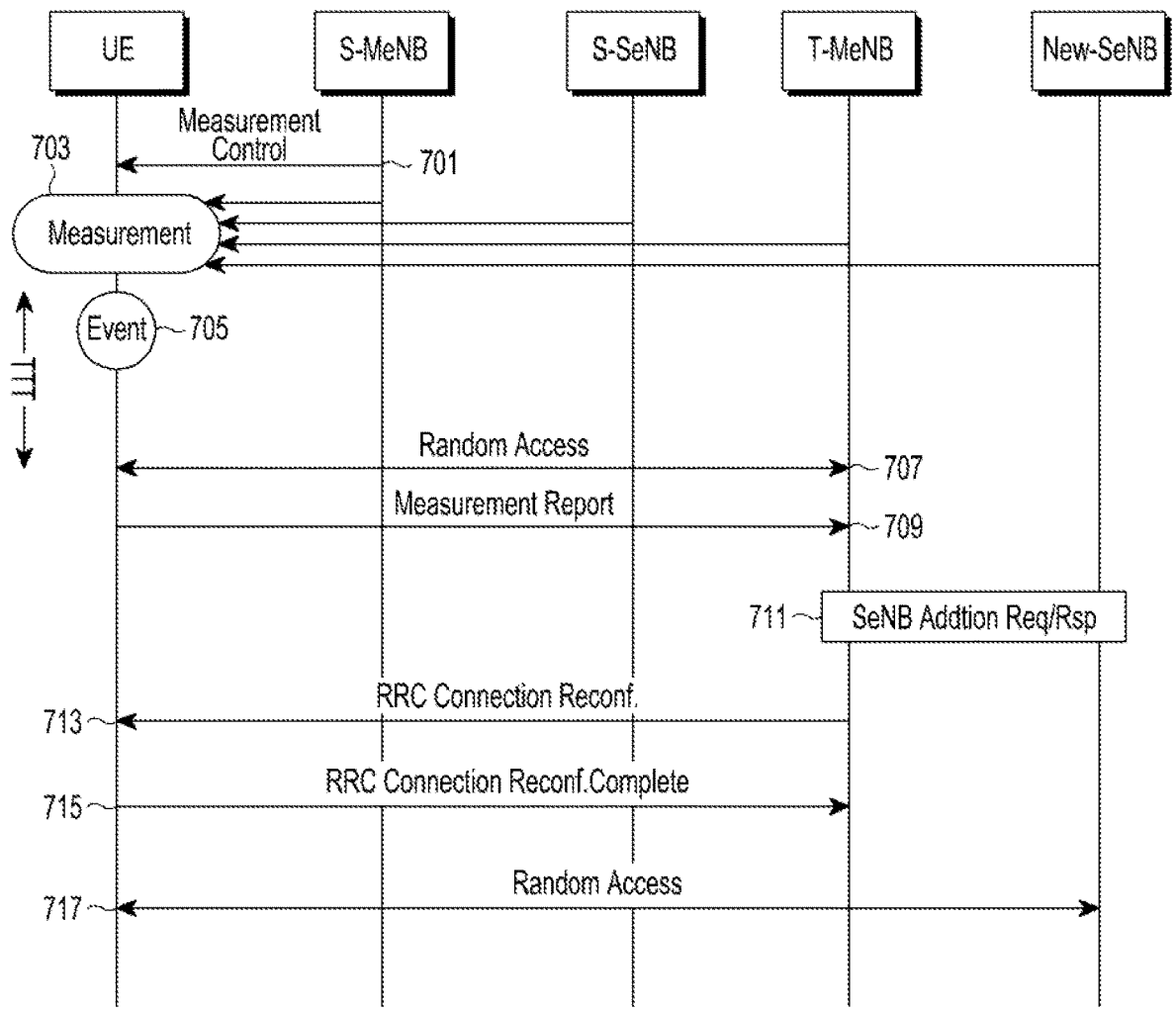
FIG. 7 is a flowchart illustrating a procedure of supporting handover with multi-connectivity in a wireless communication system according to a first embodiment of the present disclosure.

FIG. 7 is a flowchart illustrating a procedure of supporting handover with multi-connectivity in a wireless communication system according to a first embodiment of the present disclosure.

Referring to FIG. 7, in operation 701, S-MeNB transmits measurement control message to UE. Measurement control message may include at least one of measurement control of candidate target MeNBs, candidate target SeNBs, measurement report triggering condition for MeNB as well as SeNB. Measurement report control or measurement report triggering condition for SeNB addition is different from those for MeNB handover. In operation 703, UE performs measurement according to the information of measurement control message. In operation 705, if an event indicated in measurement control message happens, then UE waits for the expiration of TTT (time-to-trigger) of MeNB handover. A value of TTT is set to '0' or more. In operation 709, the event of measurement report to T-MeNB continues at the expiration of TTT, then UE transmits measurement report message to T-MeNB. Before transmitting measurement report message, UE may perform random access with T-MeNB in operation 707. T-MeNB allocates UL grant for measurement report signaling when receiving random access from UE. The measurement report message uses predefined random access resource as an indication of MeNB handover to T-MeNB. The random access resources for being allocated UL grant for the measurement report message is distinguished from general random access resources. The measurement report message includes measurement result (e.g., at least one of RSRP, RSRQ, SINR, beam state information, beam index) of SeNBs under T-MeNB. The measurement report message may include candidate SeNB identifier under T-MeNB. T-MeNB may determine whether UE can be served by T-MeNB. T-MeNB determines whether SeNB is needed for serving UE based on at least one of signal quality, beam state information, beam index, stored information of the relationship between beam state information, beam index and SeNB based on UE's report. In operation 711, T-MeNB performs SeNB addition procedure with new SeNB through SeNB addition request and SeNB addition response messages. In SeNB addition response message at least one of RACH information of new SeNB, dedicated RACH preamble of new SeNB may be included. The RACH resource is determined based on at least one of beam state information, beam index of new SeNB. In operation 713, T-MeNB transmits RRC Connection Reconfiguration message to UE which includes new SeNB information (center frequency, identifier), RACH information of new SeNB, beamforming information (beam state information, beam index) of new SeNB, dedicated RACH preamble of new SeNB based on at least one of beam state information, beam index reported by UE. UE responds with RRC Connection Reconfiguration Complete message in operation 715, and performs random access procedure with new SeNB in operation 717. T-MeNB may fetch UE's context from MME or T-MeNB may get UE's context from S-MeNB.

In UE performs handover transaction with T-MeNB and/or accesses to SeNB of T-MeNB, T-MeNB may inform UE's handover to S-MeNB. Although not shown in FIG. 7, when receiving UE's handover notification, S-MeNB performs SeNB release procedure with S-SeNB. Although not shown in FIG. 7, S-MeNB, S-SeNB, T-MeNB and new SeNB perform path change procedures, UE packet forwarding between S-MeNB and T-MeNB. In other words, during handover transaction and connection reconfiguration of the UE to the T-MeNB, the SeNB and T-MeNB may perform path setup and packet delivery procedures for continuity of services to the UE.

Figure 8:
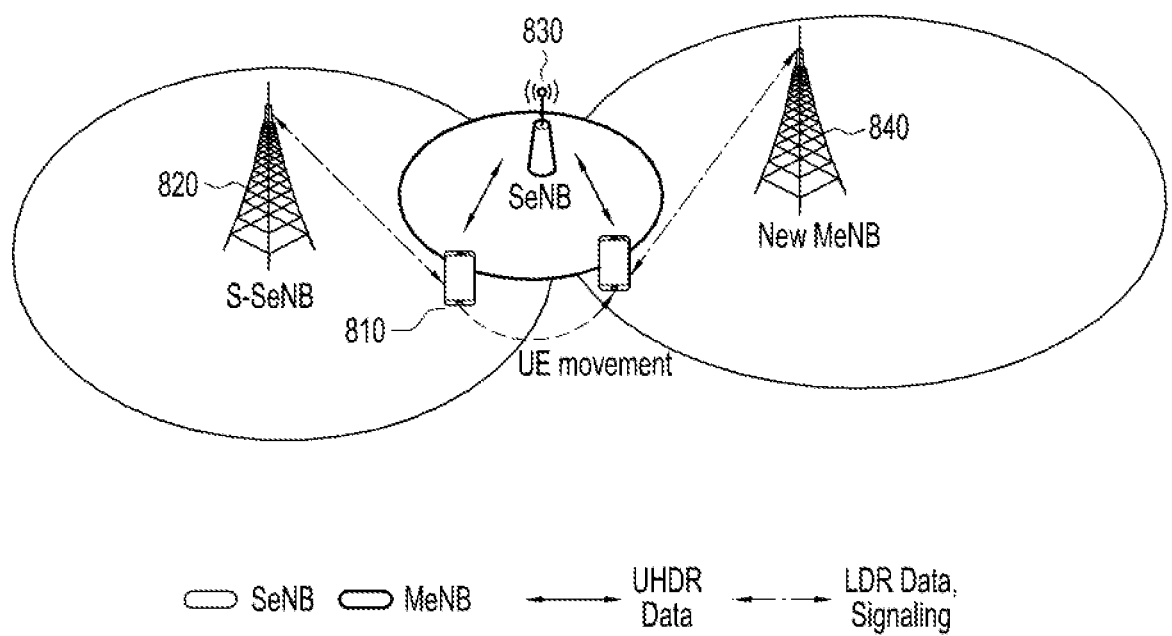
FIG. 8 is a block diagram of a wireless communication system according to a second embodiment of the present disclosure.

FIG. 8 is a block diagram of a wireless communication system according to a second embodiment of the present disclosure.

Referring to FIG. 8, there is a case where UE 810 should performs handover from serving macro cell BS 820 to target macro cell BS 840 but handover condition of serving small cell BS 830 to new small cell is not met (e.g., signal quality of serving small cell BS is good enough to serve UE 810. For example, a value of signal quality of serving small cell BS is greater than a threshold). Such small cell BS 830 can serve UE 810 with multiple MeNBs, i.e., one small cell BS 830 operates under serving MeNB as well as target MeNB from UE 810 perspective.

Based on UE's 810 measurement report, S-MeNB 820 may determine UE's 810 handover to T-MeNB 840. If UE's 810 handover condition to T-MeNB 840 is met but SeNB 830 should be kept for UE 810 then the S-MeNB 820 informs UE's 810 handover with SeNB information to T-MeNB 840. T-MeNB 840 and SeNB 830 setup path for UE packet forwarding. UE's 810 pending packets are forwarded from SeNB to T-MeNB 840 or from S-MeNB 820 to T-MeNB 840. While UE's handover transaction to T-MeNB 840 and UE's connection reconfiguration with T-MeNB 840, SeNB and T-MeNB 840 can perform path setup and packet forwarding procedures for UE's service continuity.

FIG. 8 presents a case in which one SeNB serves UE at S-MeNB 820 as well as T-MeNB 840. In an embodiment, more than 1 SeNB serving UE at S-MeNB continues to serve UE at T-MeNB 840. In detail, all SeNBs serving UE at S-MeNB 820 continue to serve UE at T-MeNB 840. Or some SeNBs serving UE at S-MeNB 820 continue to serve UE at T-MeNB 840 and other SeNBs serving UE at S-MeNB 820 stop serving UE at T-MeNB 840. Or some SeNBs serving UE at S-MeNB 820 continue to serve UE at T-MeNB 840 and new SeNBs are added to serve UE at T-MeNB 840.

Figure 9:
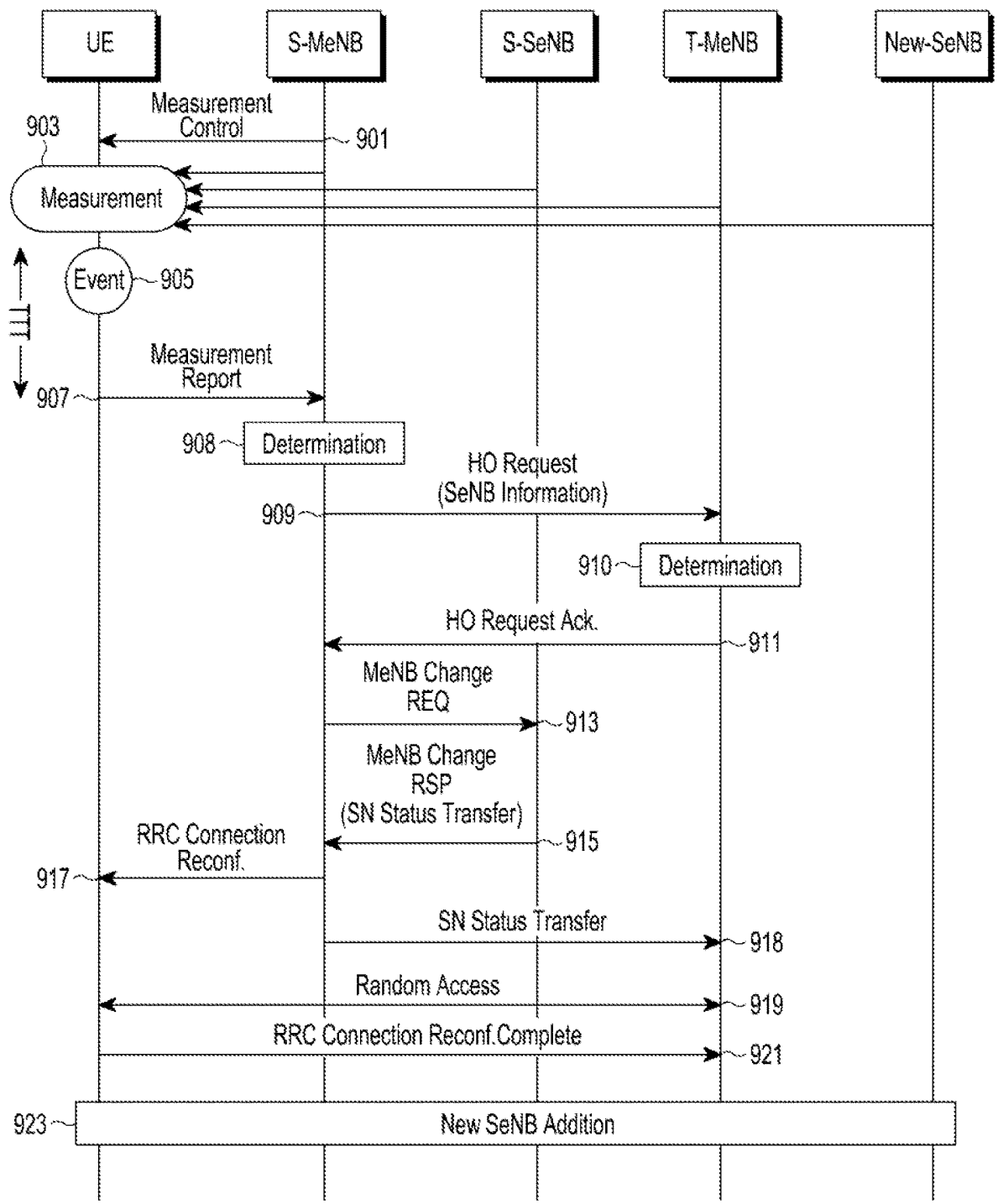
FIG. 9 is a flowchart illustrating a procedure of supporting handover with multi-connectivity in a wireless communication system according to a second embodiment of the present disclosure.

FIG. 9 is a flowchart illustrating a procedure of supporting handover with multi-connectivity in a wireless communication system according to a second embodiment of the present disclosure.

Referring to FIG. 9, in operation 901, S-MeNB transmits measurement control message to UE. Measurement control message includes measurement control of candidate target MeNBs, candidate target SeNBs, measurement report triggering condition for MeNB as well as SeNB. Measurement report control or measurement report triggering condition for SeNB addition is different from those for MeNB handover. In operation 903, UE performs measurement according to the information of measurement control message. In operation 905, if an event indicated in measurement control message happens, then UE waits for the expiration of TTT (time-to-trigger) of MeNB handover. A value of TTT is set to '0' or more. The event of measurement report continues at the expiration of TTT, then UE transmits measurement report message to S-MeNB in operation 907. When the event requires measurement report of candidate target MeNB, UE reports SeNBs under candidate target MeNB (e.g., at least one of SeNB's center frequency, SeNB ID, beam state information, beam index of SeNB) to S-MeNB. According to UE's measurement report, S-MeNB determines candidate target MeNB and candidate new SeNB in operation 908. If S-MeNB determines that serving SeNB should serve UE in candidate target MeNB, then the S-MeNB informs UE's handover to the candidate target MeNB and the SeNB through HO request message in operation 909. The HO request message includes SeNB information. If more than one SeNB serving UE may continue to serve UE at the candidate target MeNB, then the SeNBs are informed to the candidate target MeNB. SeNBs beam state information, beam index is informed to the candidate target MeNB. Relationship between SeNBs beam state information, beam index and SeNB is stored at the candidate target MeNB which is used for deciding SeNB(s) to add. In an additional embodiment, the HO request message may include measurement result (e.g., at least one of RSRP, RSRQ, SINR, beam state information, beam index) of other SeNBs of the candidate target MeNB. In another embodiment, the HO request message may include other SeNBs' identifiers of the candidate target MeNB. The other SeNB information such as at least one of signal quality, resource availability, beam state information, beam index may be used for candidate target MeNB to check whether other SeNB can be a new SeNB instead of serving SeNB. Based on the SeNB information of HO request message, candidate target MeNB determines serving SeNB for UE after handing-over to the candidate target MeNB in operation 910, where serving SeNB may be the same SeNB of S-MeNB or is new SeNB. In operation 911, the candidate target MeNB responds with HO Request ack message which includes at least one of selected SeNB (serving SeNB or new SeNB), random access information of candidate target MeNB, dedicated RACH preamble of candidate target MeNB. When current SeNB is selected, then in operation 913, S-MeNB transmits MeNB Change req message to the SeNB, and informs new target MeNB information. In operation 915, the SeNB responds with MeNB Change RSP message. The MeNB Change RSP message may include UE's packet information e.g., Sequence Number (SN) status transfer.

Subsequently, in operation 917, S-MeNB sends an RRC connection reconfiguration message to UE to perform handover to a target MeNB. The RRC connection reconfiguration message may include at least one of RACH information of the target MeNB, dedicated RACH preamble at the target MeNB, SeNB information (identifier of SeNB or indicator of change in SeNB). In operation 918, SN Status transfer occurs, as illustrated in FIG. 9.

In operation 919, UE uses information obtained from the RRC connection reconfiguration message to perform random access with the target MeNB. After completion of the random access with the target MeNB, the UE sends an RRC connection reconfiguration complete message to the target MeNB in operation 921.

The UE may then perform operation of adding a new SeNB in operation 923.

Figure 10:
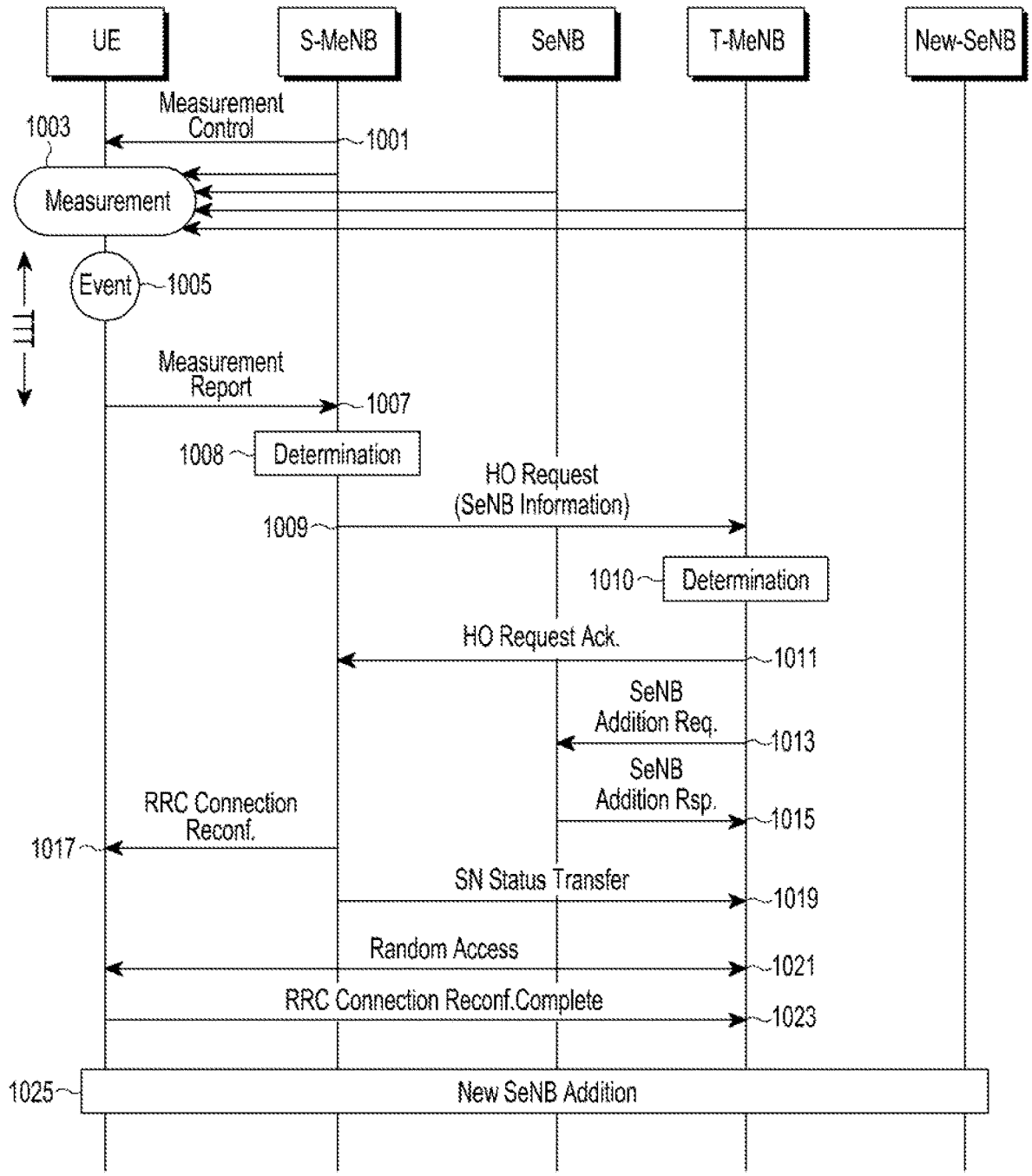
FIG. 10 is a flowchart illustrating a procedure of supporting handover with multi-connectivity in a wireless communication system according to a second embodiment of the present disclosure.

FIG. 10 is a flowchart illustrating a procedure of supporting handover with multi-connectivity in a wireless communication system according to a second embodiment of the present disclosure.

Referring to FIG. 10, in operations 1003 and 1005, T-MeNB informs SeNB that SeNB will serve UE with T-MeNB through SeNB addition procedure between T-MeNB and SeNB.

When data path has not setup between SeNB and T-MeNB then path setup procedure is performed.

In operation 1017, S-MeNB transmits RRC Connection Reconfiguration message to command to perform handover to the target MeNB. The RRC Connection Reconfiguration message may include at least one of RACH information of target MeNB, dedicated RACH preamble at target MeNB, SeNB information (SeNB identifier or SeNB change indicator).

In operation 1021, UE performs random access with the target MeNB using the information gotten in RRC connection reconfiguration message. UE completes random access with the target MeNB and transmits RRC Connection Reconfiguration complete message to the target MeNB in operation 1023. If SeNB at the target MeNB is same as those of S-MeNB, then random access with SeNB may be omitted.

While UE's handover transaction or connection reconfiguration with the target MeNB, if path between the target MeNB and serving SeNB has not been established then path setup procedure between the target MeNB and serving SeNB is performed. Also UE's pending packets can be forwarded between S-MeNB and T-MeNB or between serving SeNB and T-MeNB.

Based on UE's measurement for SeNB at the T-MeNB, new SeNB is selected for UE using SeNB addition procedure.

When SeNB no longer serve UE at T-MeNB then T-MeNB informs that SeNB release UE's contexts through SeNB release procedure.

Figure 11:
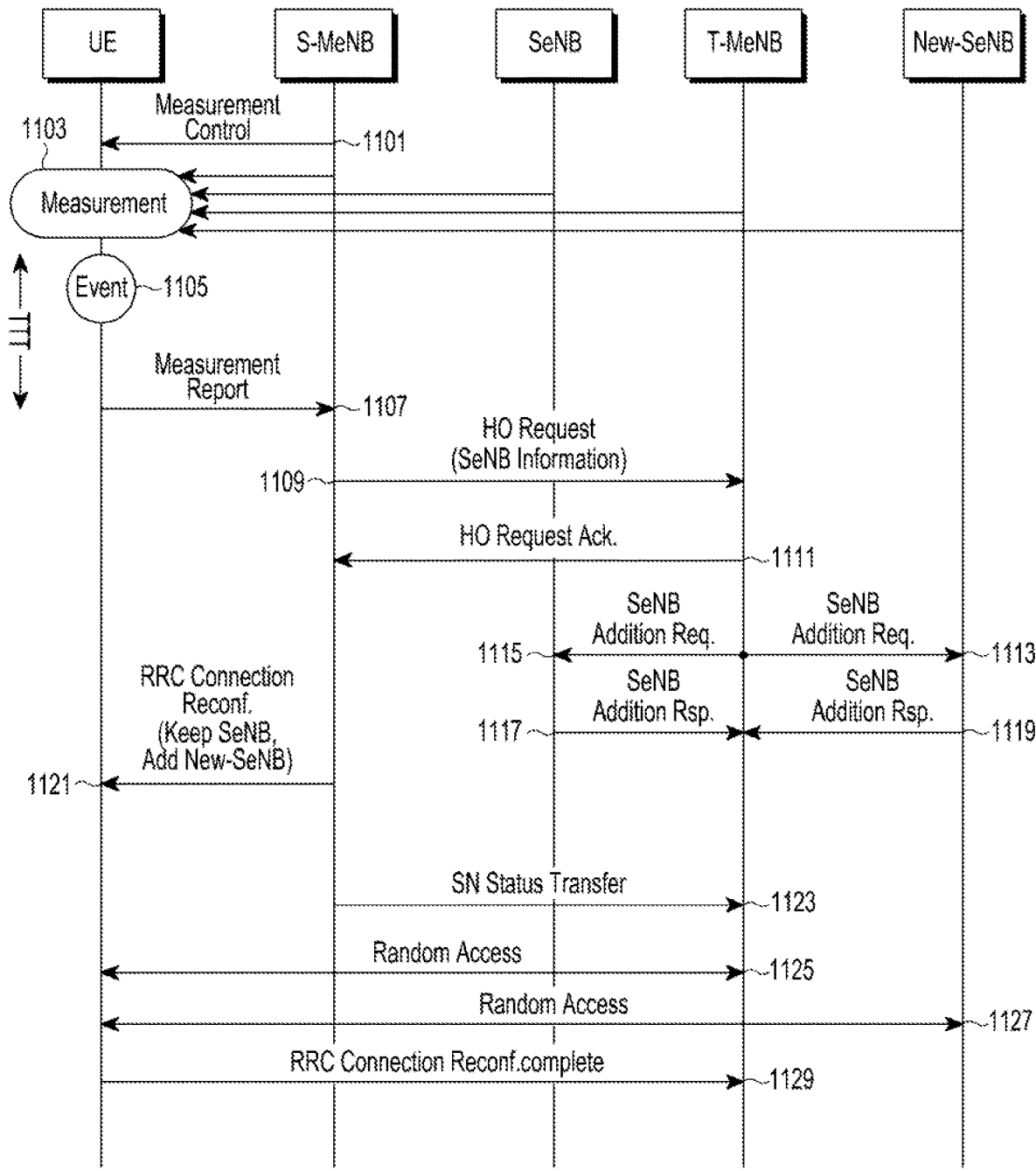
FIG. 11 is a flowchart illustrating a procedure of supporting handover with multi-connectivity in a wireless communication system according to a second embodiment of the present disclosure.

FIG. 11 is a flowchart illustrating a procedure of supporting handover with multi-connectivity in a wireless communication system according to a second embodiment of the present disclosure.

Referring to FIG. 11, in operations 1103, 1105, during MeNB handover procedure, new SeNB addition procedure at target MeNB can be performed while a procedure to maintain serving SeNB at target MeNB is performed. The new SeNB information and no change of serving SeNB indication are provided to UE through a signaling of handover command such as RRC connection reconfiguration.

Figure 12:
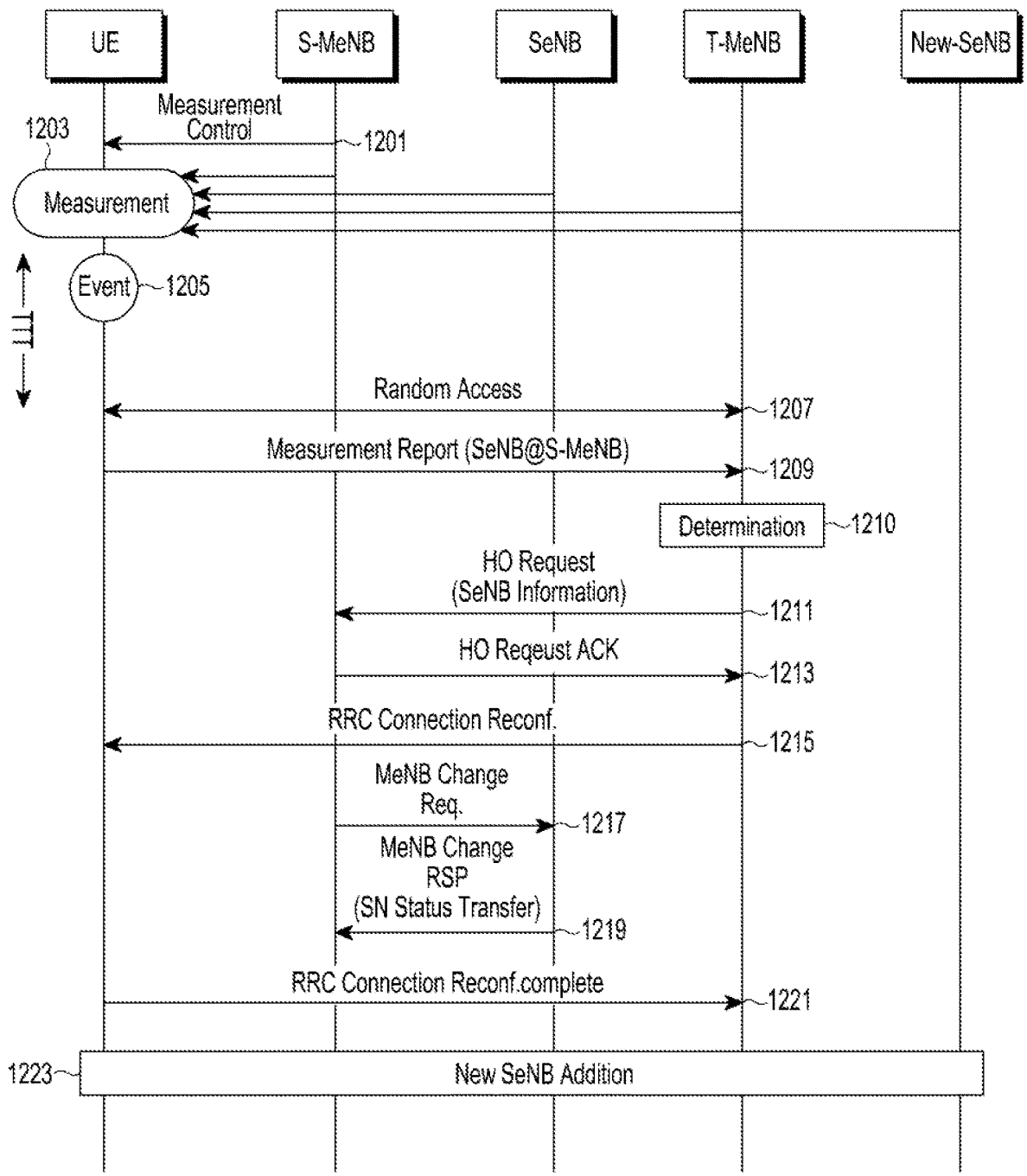
FIG. 12 is a flowchart illustrating a procedure of supporting handover with multi-connectivity in a wireless communication system according to a second embodiment of the present disclosure.

FIG. 12 is a flowchart illustrating a procedure of supporting handover with multi-connectivity in a wireless communication system according to a second embodiment of the present disclosure.

Referring to FIG. 12, in operation 1201, S-MeNB transmits measurement control message to UE. Measurement control message includes measurement control of candidate target MeNBs, candidate target SeNBs, measurement report triggering condition for MeNB as well as SeNB. Measurement report control or measurement report triggering condition for SeNB addition is different from those for MeNB handover. In operation 1203, UE performs measurement according to the information of measurement control message. In operation 1205, if an event indicated in measurement control message happens, then UE waits for the expiration of TTT (time-to-trigger) of MeNB handover. A value of TTT is set to '0' or more. The event of measurement report to T-MeNB continues at the expiration of TTT, then UE transmits measurement report message to the T-MeNB. Before transmitting measurement report message, UE may perform random access with T-MeNB in operation 1207.

UE sends the measurement report message to the T-MeNB in operation 1209. T-MeNB allocates UL grant for UE to transmit measurement report in operation 1209. A predefined random access resource can be used to request UL grant for measurement report signaling. The random access resources for being allocated UL grant for the measurement report message is distinguished from general random access resources. The measurement report message includes measurement result (e.g., RSRP, RSRQ, SINR, beam state information, beam index) of serving SeNB, measurement result of other SeNBs under T-MeNB. The measurement report message may include SeNBs' identifiers of T-MeNB. Based on the measurement report (signal quality, beam state information, beam index) or resource availability at SeNB(s) the T-MeNB determines SeNB who serve UE after UE's handing-over to T-MeNB in operation 1210, where SeNB is the same SeNB at S-MeNB or new SeNB. More than 1 SeNB serving UE at S-MeNB may continue serve UE at T-MeNB.

In operation 1211, the T-MeNB transmits HO request message to S-MeNB which indicates that UE will handover to T-MeNB and SeNB who serve UE at T-MeNB. In operation 1213, S-MeNB sends the T-MeNB HO Request ack message which may include UE's information.

T-MeNB then sends an RRC connection reconfiguration message to UE, in operation 1205.

In operation 1207, S-MeNB transmits MeNB Change Req message to serving SeNB which includes T-MeNB information. In operation 1209, Serving SeNB responds with MeNB Change RSP message which includes UE's packet forwarding information e.g., SN Status transfer. UE then sends an RRC connection reconfiguration complete message to T-MeNB in operation 1217. UE may then perform operation of adding a new SeNB in operation 1213. In operation 1219, SN Status transfer occurs, as illustrated in FIG. 12.

Figure 13:
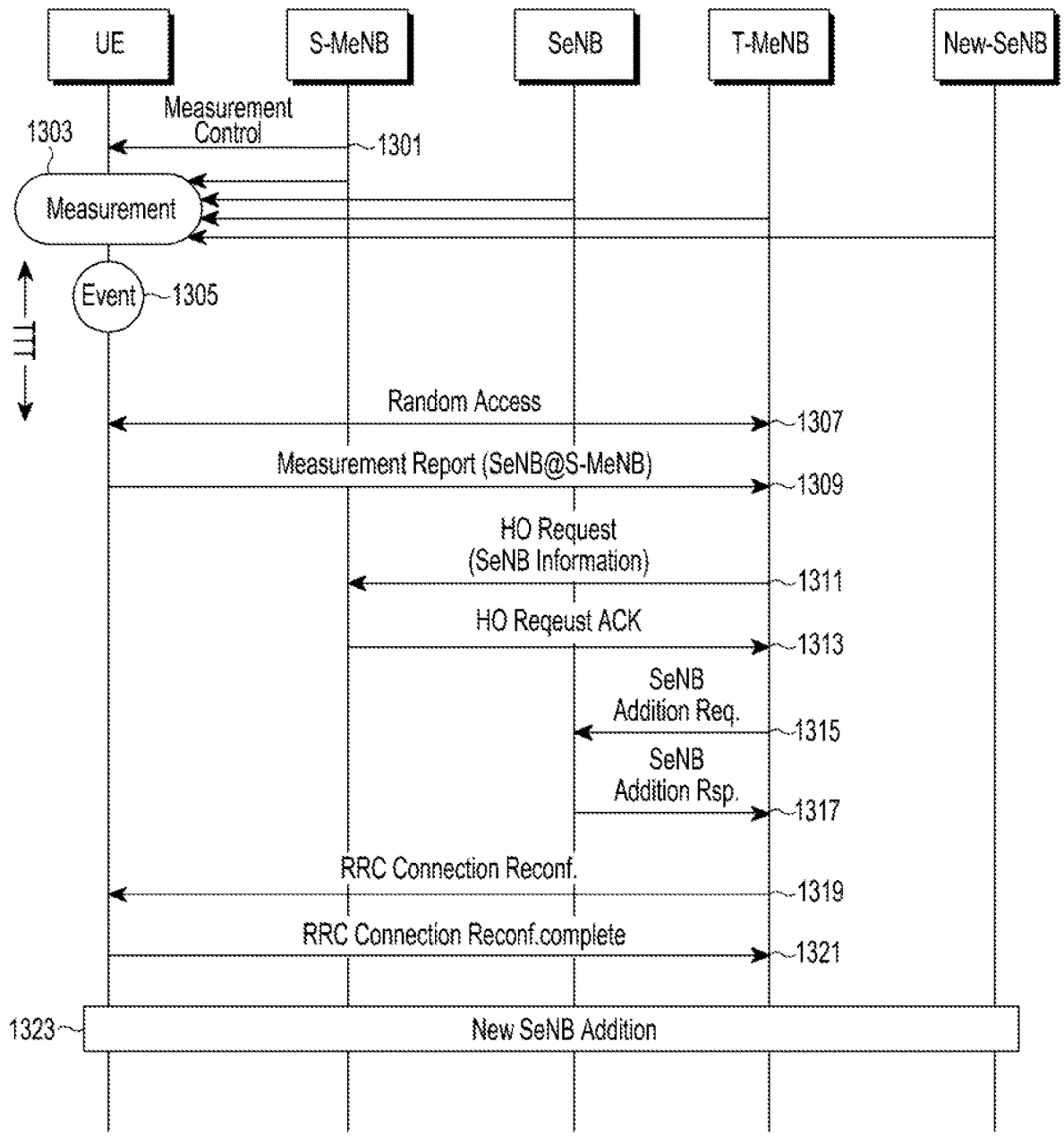
FIG. 13 is a flowchart illustrating a procedure of supporting handover with multi-connectivity in a wireless communication system according to a second embodiment of the present disclosure.

FIG. 13 is a flowchart illustrating a procedure of supporting handover with multi-connectivity in a wireless communication system according to a second embodiment of the present disclosure.

Referring to FIG. 13, in an embodiment, in operations 1301, 1303, T-MeNB informs SeNB that SeNB will serve UE with T-MeNB through SeNB addition procedure between T-MeNB and SeNB.

If path has not been setup between T-MeNB and serving SeNB then path setup procedure between T-MeNB and serving SeNB is performed. Also UE's pending packets can be forwarded between S-MeNB and T-MeNB or between serving SeNB and T-MeNB.

T-MeNB transmits RRC Connection Reconfiguration message to UE which includes SeNB information (SeNB ID, SeNB change indicator, etc.). UE responds with RRC Connection Reconfiguration Complete message.

Based on UE's measurement at the T-MeNB, new SeNB is selected for UE using SeNB addition procedure.

When SeNB no longer serve UE, then the SeNB is released for UE using SeNB release procedure.

Figure 14:
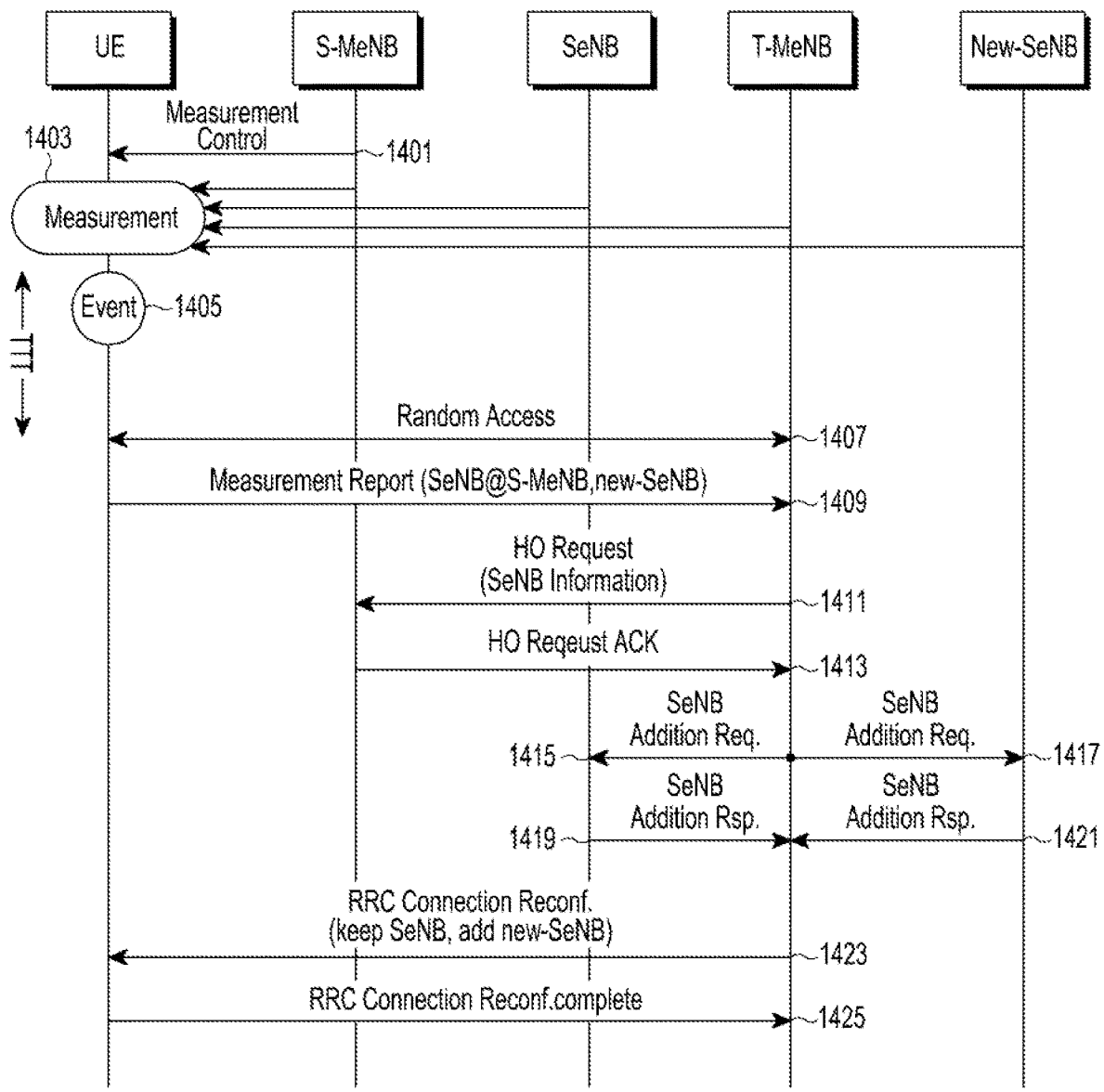
FIG. 14 is a flowchart illustrating a procedure of supporting handover with multi-connectivity in a wireless communication system according to a second embodiment of the present disclosure.

FIG. 14 is a flowchart illustrating a procedure of supporting handover with multi-connectivity in a wireless communication system according to a second embodiment of the present disclosure.

Referring to FIG. 14, in operations 14017, 1421, during MeNB handover procedure, new SeNB addition procedure at target MeNB can be performed while a procedure to maintain serving SeNB at target MeNB is performed. The new SeNB information and no change of serving SeNB indication are provided to UE through a signaling of handover confirmation such as RRC connection reconfiguration.

Figure 15A:
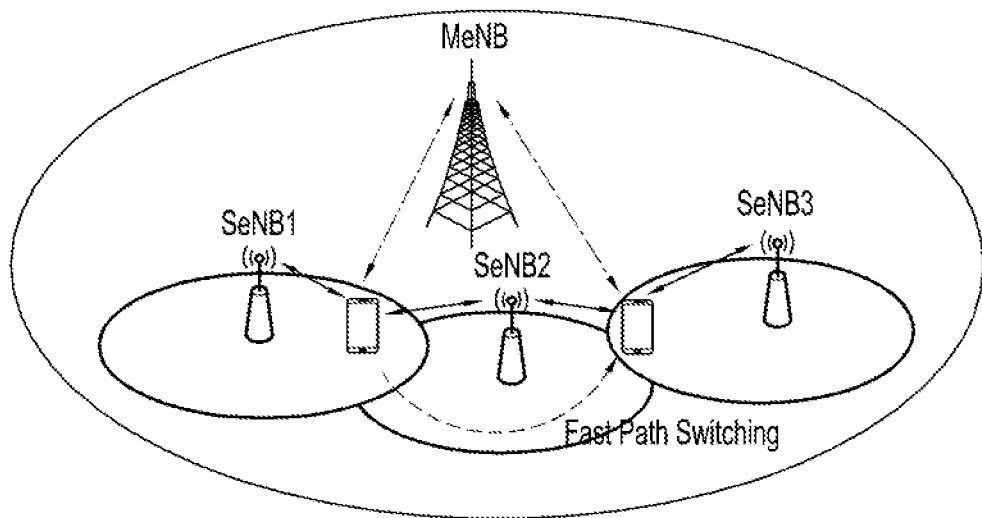
FIGS. 15A and 15B is a block diagram of a wireless communication system according to a third embodiment of the present disclosure.
Figure 15B:
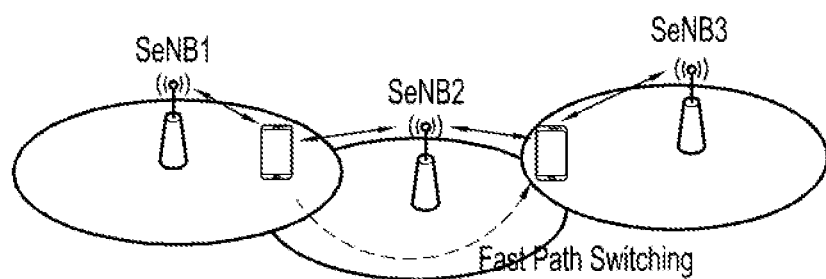

FIGS. 15A and 15B are block diagrams of a wireless communication system according to a third embodiment of the present disclosure.

In the third embodiment of the present disclosure, it is assumed that the proposed operation is triggered in case that UE operates very low latency and/or ultra-reliable packet transmission/reception in higher frequency band than current LTE.

Referring to FIG. 15A, not only serving SeNB but other SeNB(s) is also prepared for UE. Other SeNB(s) does not serve UE until UE switches to other SeNB(s). Other SeNB(s) for UE may be selected by MeNB based on at least one of UE measurement including beam state information, beam index, available resource at other SeNB(s) or stored information at MeNB of the relationship between SeNB and beam index based on UE's beam report. A metric for SeNB switch may be determined by MeNB, where the metric may be different from that is used to send measurement report for normal handover. A metric may be applied to beam index used or measured between SeNB and UE. When UE detects signal quality degradation at serving SeNB as the metric, UE switches to one of other SeNB(s) with sending an indicator of the SeNB change to MeNB (e g, handover indicator due to sudden link drop at serving SeNB). In other example UE switches to one of other SeNB(s) without sending an indicator of the SeNB change to MeNB. To support fast switching from serving SeNB to other SeNB, UE context is pre-fetched at other SeNB(s) under MeNB's control. To support fast switching from serving SeNB to other SeNB, same UE context is used among SeNBs under same MeNB. To support fast switching from serving SeNB to other SeNB, same UE context is used among SeNBs under an eNB controller. UE context may include at least one of security key, MAC context, RLC context, PDCP context. In accordance with the present disclosure, MeNB indicates UE which context is kept at other SeNB(s). To support fast switching from serving SeNB to other SeNB, dedicated random access resource at other SeNB(s) is provided to UE. In an embodiment, a dedicated random access resource validity timer can be applied for the dedicated random access resource. A dedicated random access resource is determined based on at least one of beam state information, beam index at other SeNB(s) reported by UE.

Referring to FIG. 15B, multiple SeNB connectivity is operated without involving MeNB regardless of MeNB coexistence with SeNB. UE can be served by SeNB as well as MeNB but the operation of this disclosure is applied to SeNB only. In FIG. 15B, the role of MeNB is taken by serving SeNB of FIG. 15A. Other SeNB(s) are selected by serving SeNB. Serving SeNB may prepare for other SeNB(s) based on UE's measurement report, resource availability at other SeNB(s) or stored information at serving SeNB of at least one of the relationship between serving/neighboring SeNB and beam index based on UE's beam report. A metric for SeNB switch is determined by serving SeNB, where the metric may be different from that is used to send measurement report for normal handover. The information of UE context at other SeNB(s) is provided through serving SeNB. The information of dedicated random access preamble resource may be provided through serving SeNB. The dedicated random access preamble resource at other SeNB(s) can be selected based on beam index reported by UE.

Figure 16:
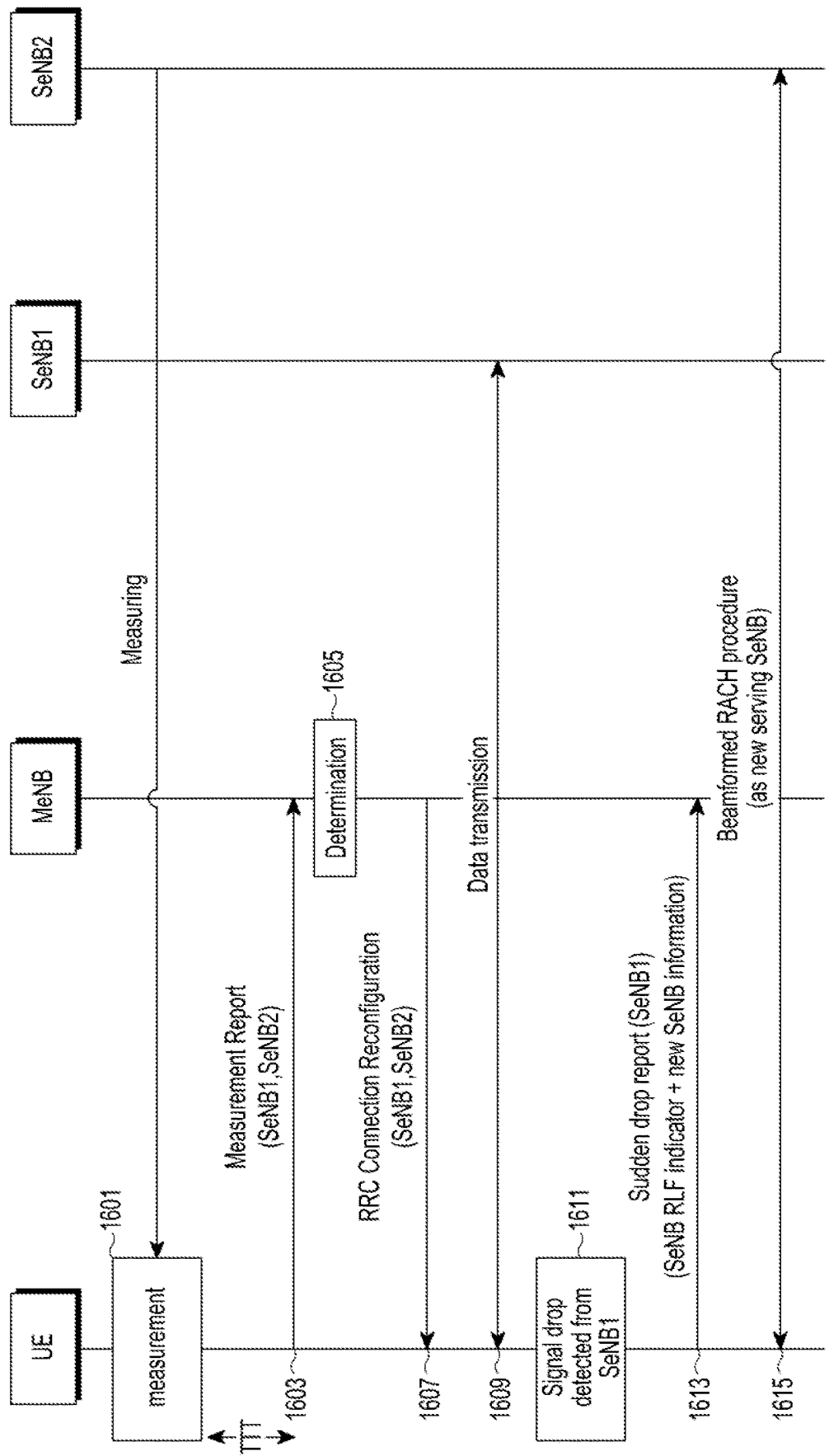
FIG. 16 is a flowchart illustrating a procedure of supporting handover with multi-connectivity in a wireless communication system according to a third embodiment of the present disclosure.

FIG. 16 is a flowchart illustrating a procedure of supporting handover with multi-connectivity in a wireless communication system according to a third embodiment of the present disclosure.

Referring to FIG. 16, in operation 1601, UE measures adjacent MeNB and SeNB. In operation 1603, UE sends MeNB a measurement report message. The measurement report message may include SeNB1 information and SeNB2 information. MeNB then determines active SeNBs (active set) and inactive SeNBs (inactive set) based on the measurement report message. In operation 1605, UE may send an RRC connection reconfiguration message to UE. The RRC connection reconfiguration message includes selected SeNB1 information, selected SeNB2 information. In operation 1607, UE and SeNB1 then may start data transmission.

In the meantime, in operation 1609, in addition to serving SeNB, other SeNB(s) can be prepared for a case where the serving SeNB becomes unable to serve UE (e.g., at least one of Radio link failure/link quality drop of serving SeNB) and service becomes unavailable through the serving SeNB before confirming UE's handover to other SeNB due to signal drop. In operation 1611, UE sends a report message including SeNB RLF indicator and new SeNB information to MeNB. The other SeNB(s) (e.g., SeNB2) is selected based on measurement report of UE. In a possible embodiment, the other SeNB(s) is selected based on resource availability at SeNB(s) for UE. In another possible embodiment, the other SeNB(s) is selected based on beam index reported by UE. MeNB store SeNB(s) information corresponding to beam state information, beam index based on UE's measurement report. SeNB addition procedure is performed between the selected other SeNB(s) and MeNB. In operation 1613, the selected other SeNB(s) is provided to UE. Based on beam index reported by UE, dedicated random access resource (e.g., at least one of preamble index, frequency resource, time resource) at other SeNB(s) is provided to UE. A metric to switch SeNB is provided to UE, where the metric is different from that to send measurement report to MeNB as handover request. The metric is applied to measured beam (e.g., best beam or beam whose signal quality is higher than a threshold A). A metric to report SeNB switching to MeNB is provided to UE, where the metric is different from that for sending measurement report to MeNB as handover request. The metric is applied to measured beam (e.g., best beam or beam whose signal quality is higher than a threshold A). UE context can be pre-fetched among MeNB, serving SeNB and other SeNB(s) based on other SeNB(s)'s location. For example, a SeNB is controlled by MeNB then UE context at serving SeNB can be kept at the SeNB.

When detecting radio problem in serving SeNB as the metric, UE runs a timer which confirms serving SeNB is unavailable (e.g., the value of TTT may be applied). After an expiration of the timer UE determines that serving SeNB is unavailable, and reports UE's switching to other SeNB or RLF of serving SeNB to MeNB. The report may include the information of selected other SeNB. UE switches to the newly selected SeNB. UE may perform random access procedure with the newly selected SeNB. If dedicated random access resource at the newly selected SeNB is provided, UE performs access procedure using the dedicated random access resource. If it is indicated that UE context is kept at the newly selected SeNB, UE continues data transaction using current UE context.

When receiving UE's switch indicator to other SeNB, MeNB informs UE's handover to serving SeNB and newly selected SeNB. UE's context fetch procedure can be performed between MeNB and serving SeNB and newly selected SeNB, if needed. Path switch procedure through newly selected SeNB for UE can be performed if needed. MeNB informs other SeNB(s) except target SeNB to release UE's context or reserved resource for UE's switch.

Figure 17:
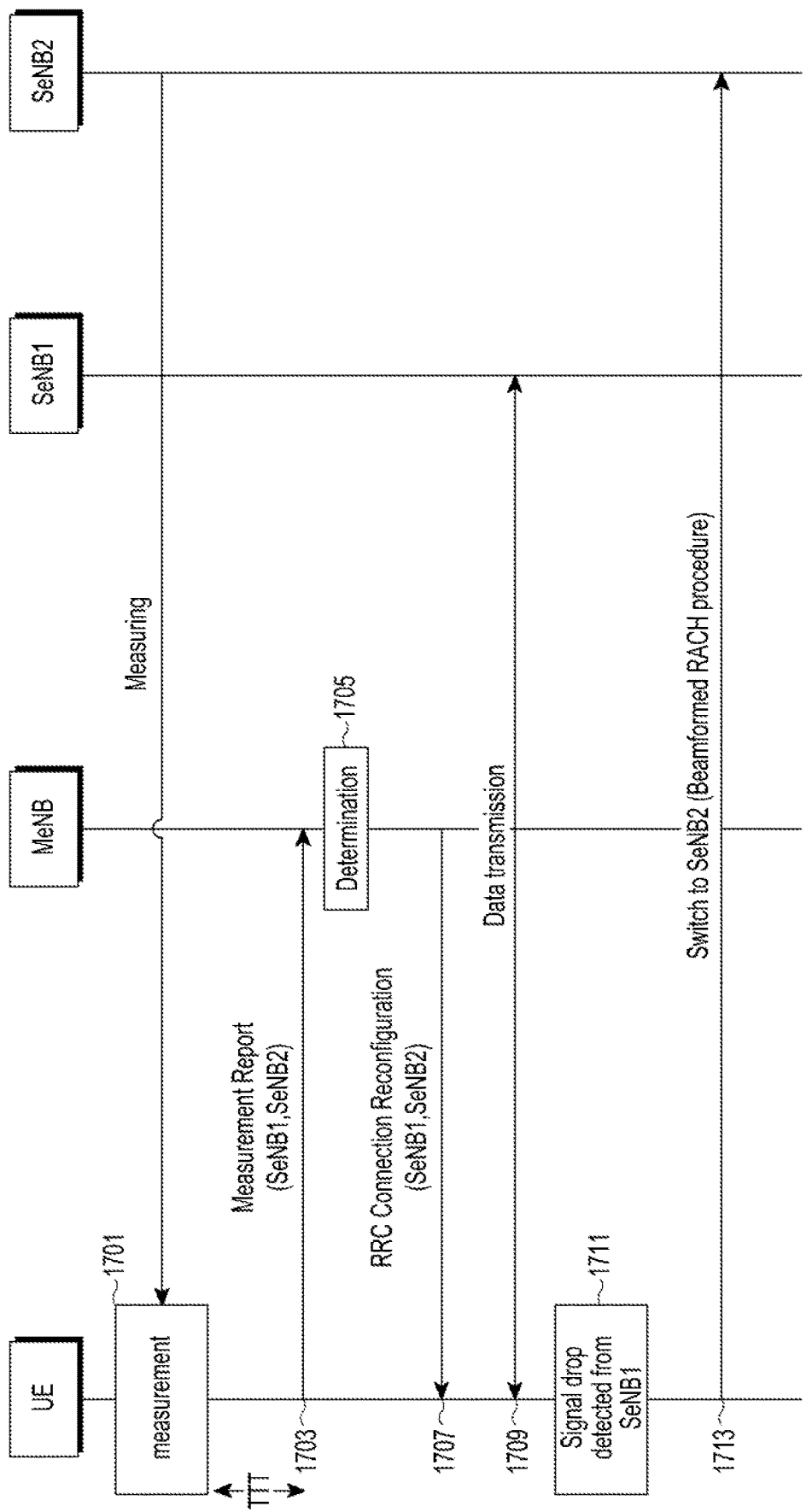
FIG. 17 is a flowchart illustrating a procedure of supporting handover with multi-connectivity in a wireless communication system according to a third embodiment of the present disclosure.

FIG. 17 is a flowchart illustrating a procedure of supporting handover with multi-connectivity in a wireless communication system according to a third embodiment of the present disclosure.

Referring to the embodiment of illustrated in FIG. 17, unlike the embodiment illustrated in FIG. 16, newly selected SeNB informs MeNB that UE's been switched to itself without UE's switching indicator or UE's RLF report to MeNB (in a case that operation 1611 of FIG. 16 is omitted). When UE detects the metric which is provided by MeNB is met to switch to one of other SeNB(s), UE selects and switches to one of other SeNB(s). Once it is indicated that UE context is kept in the newly selected SeNB, UE continues data transaction using the current UE context. When target SeNB detects UE's switch through dedicated random access resource or through a signaling (including identifier of UE) from UE, target SeNB informs UE's handover to MeNB and/or serving SeNB. Target SeNB can get UE's context from MeNB and/or serving SeNB. Target SeNB can perform path update for UE. MeNB informs other SeNB(s) except target SeNB to release UE's context or reserved resource for UE's switch.

Figure 18:
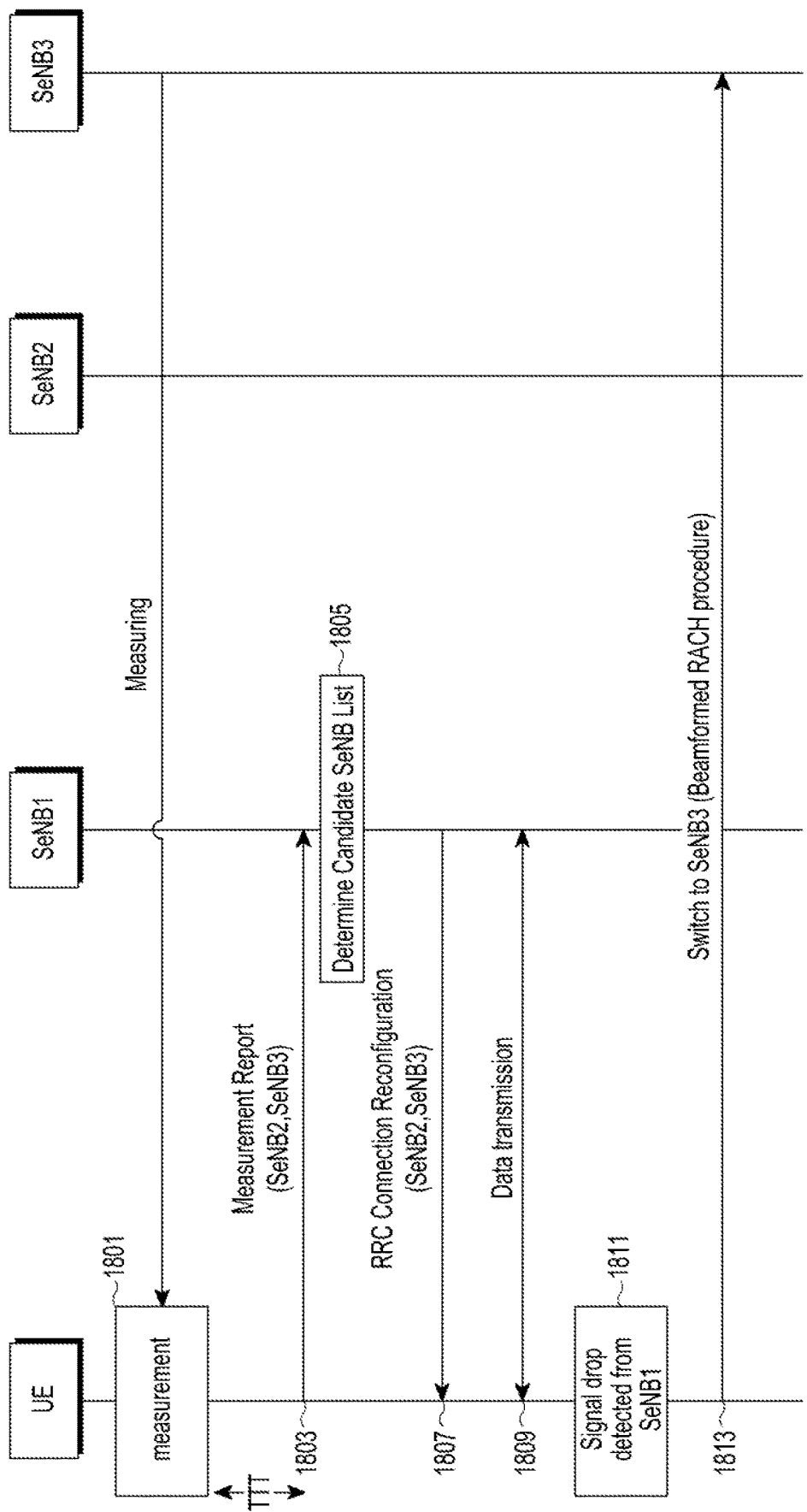
FIG. 18 is a flowchart illustrating a procedure of supporting handover with multi-connectivity in a wireless communication system according to a third embodiment of the present disclosure.

FIG. 18 is a flowchart illustrating a procedure of supporting handover with multi-connectivity in a wireless communication system according to a third embodiment of the present disclosure.

Operation 1803 of FIG. 18 sends information of SeNB2, SeNB 3. Furthermore, while in operation 1709 of FIG. 17 data is sent from UE to SeNB 1, in operation 1807 of FIG. 18 data is sent to SeNB 1 serving as MeNB from UE. Compared to UE switching to SeNB 2 in FIG. 17, UE switches SeNB 3 in FIG. 18.

Unlike FIG. 17, in FIG. 18, serving SeNB controls a list of other SeNB(s) which UE switch to and a metric with which UE determines to switch to one of other SeNB(s). Serving SeNB manages UE's context (including e.g., at least one of security key, PDCP information, RLC information, MAC information, radio resource configuration information) which can be shared among other SeNB(s), where UE context at serving SeNB may be kept at target SeNB after UE switches to target SeNB.

In operation 1801, UE measures one or more neighboring SeNBs. Conditions for the measurement may include at least one of detection of a target cell, detection of candidate cells for UE based on handover procedures, and triggering of performing handover at UE based on handover procedures. In operation 1803, UE sends a measurement report message to a serving SeNB. The measurement report message may include at least one of information of SeNB2 and information of SeNB3. The serving SeNB may determine a list of at least one or more candidate SeNBs to which UE may switch based on at least one of the measurement report message received from the UE, information of resource availability of other SeNBs, beam state information of UE, and information of candidate SeNB corresponding to UE's beam state information and beam index. Information stored for an SeNB corresponding to the beam state information and beam index may be used in providing the same candidate SeNB(s) to other UEs. In an embodiment, the serving SeNB may determine active SeNBs (active set) and inactive SenBs (inactive set) based in at least a part of information included in the measurement report message.

In operation 1807, the serving SeNB sends an RRC connection reconfiguration message to UE. In the RRC connection reconfiguration message, at least one of a list of candidate SeNBs, information regarding active SeNBs, and information regarding inactive SenBs may be included. In an embodiment, the RRC connection reconfiguration message may include at least one of random access resources (including e.g., at least one of preamble index, frequency resources, and time resources) in other SeNB(s). In an embodiment, the RRC connection reconfiguration message may include a metric to switch SeNB. The metric to switch SeNB is different from one to send a measurement report to SeNB as handover request. The metric may be applied to measured beam (e.g., best beam or beam whose signal quality is higher than a threshold A).

Even after the RRC connection reconfiguration message is received in operation 1807, UE and SeNB1 may keep performing data transmission.

Meanwhile, in an embodiment, in operation 1811, the serving SeNB may be unable to serve UE (e.g., due to wireless link failure and/or link quality drop of the serving SeNB), and due to signal drop, UE may detect the wireless link failure with the serving SeNB. Determination of the wireless link failure may be applied to the best beam between UE and the serving SeNB. In an embodiment, once the wireless link failure is determined, UE runs a timer to determine that the serving SeNB is unavailable. After expiration of the timer, the UE may determine that the serving SeNB is unavailable. In another embodiment, UE runs a timer to determine that a link quality value of the serving SeNB is lower than threshold B and a link quality value of at least one of the candidate SeNBs in the list of candidate SeNBs is higher than threshold A. Determination of the link quality value may be applied to the best beam between UE and the serving SeNB, and between UE and the at least one candidate SeNB in the list of candidate SeNBs. After expiration of the timer, the UE may determine that the serving SeNB is unavailable.

In operation 1813, when UE detects that a metric is met as indicated by the serving SeNB, UE determines a target SeNB among other SeNB(s) in the list of candidate SeNBs and switches to a target SeNB. In an embodiment, UE may perform a random access procedure with the newly selected SeNB. If a dedicated random access resource at the newly selected SeNB is provided, UE performs an access procedure using the dedicated random access resource. In an embodiment, the dedicated random access resource may be determined based on beam state information/beam index reported by UE to other SeNB(s). If it is indicated that UE context is kept at the newly selected SeNB, UE continues data transaction using current UE context. Information indicating that the dedicated random access resource at the selected SeNB and the UE context are kept in the newly selected SeNB may be included in the RRC connection reconfiguration message.

The target SeNB recognizes the UE's switching through signaling (including an identifier of UE) from UE or the dedicated random access resource. The target SeNB informs UE's switching to the serving SeNB and/or other SeNB(s) except itself. The target SeNB can obtain UE's context from the serving SeNB or designated network entity for UE context if needed. The target SeNB performs a path update procedure for UE.

Figure 19:
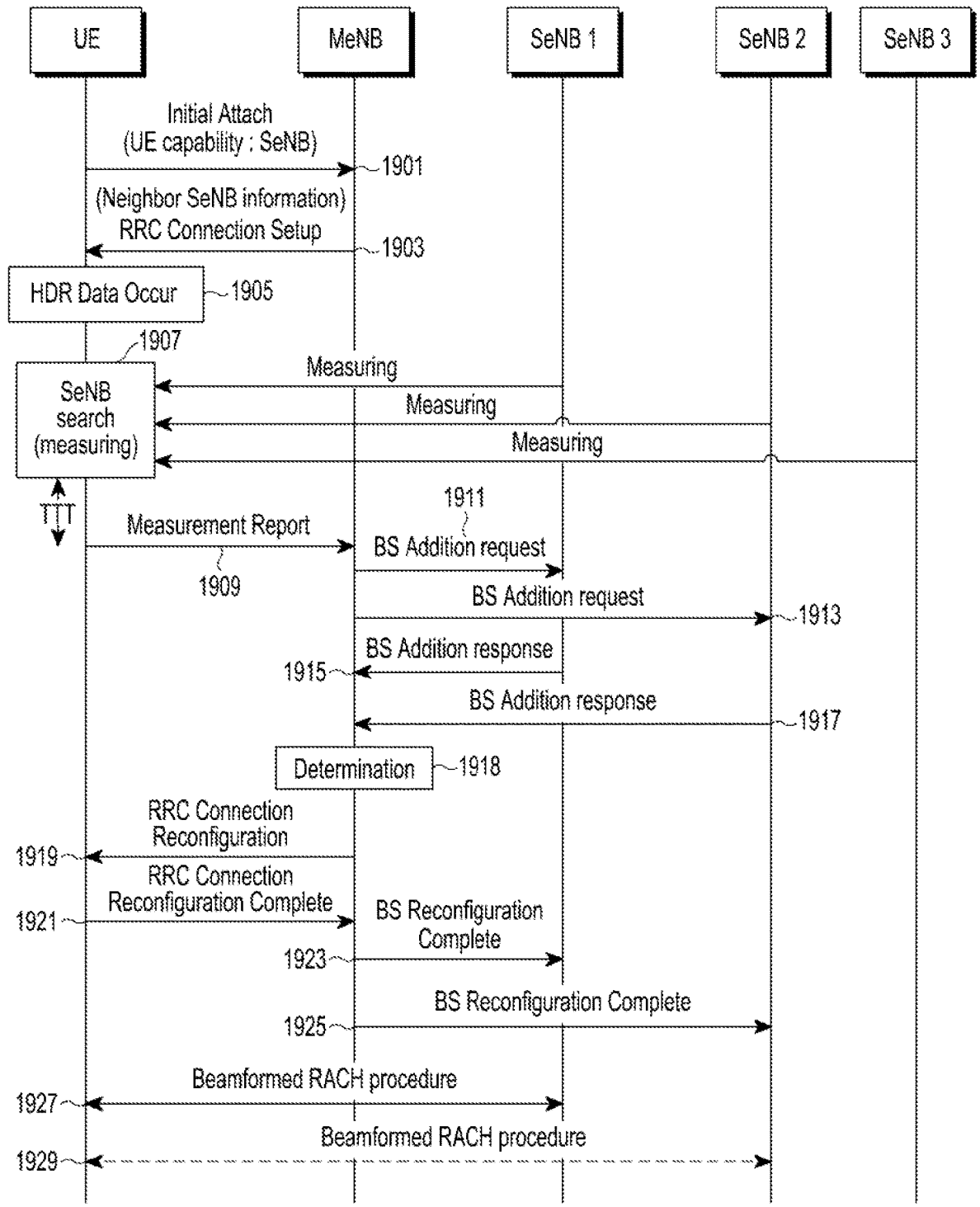
FIGS. 19, 20, 21, 22, 23, 24, 25, and 26 are flowcharts illustrating procedures of SeNB addition according to various embodiments of the present disclosure.
Figure 20:
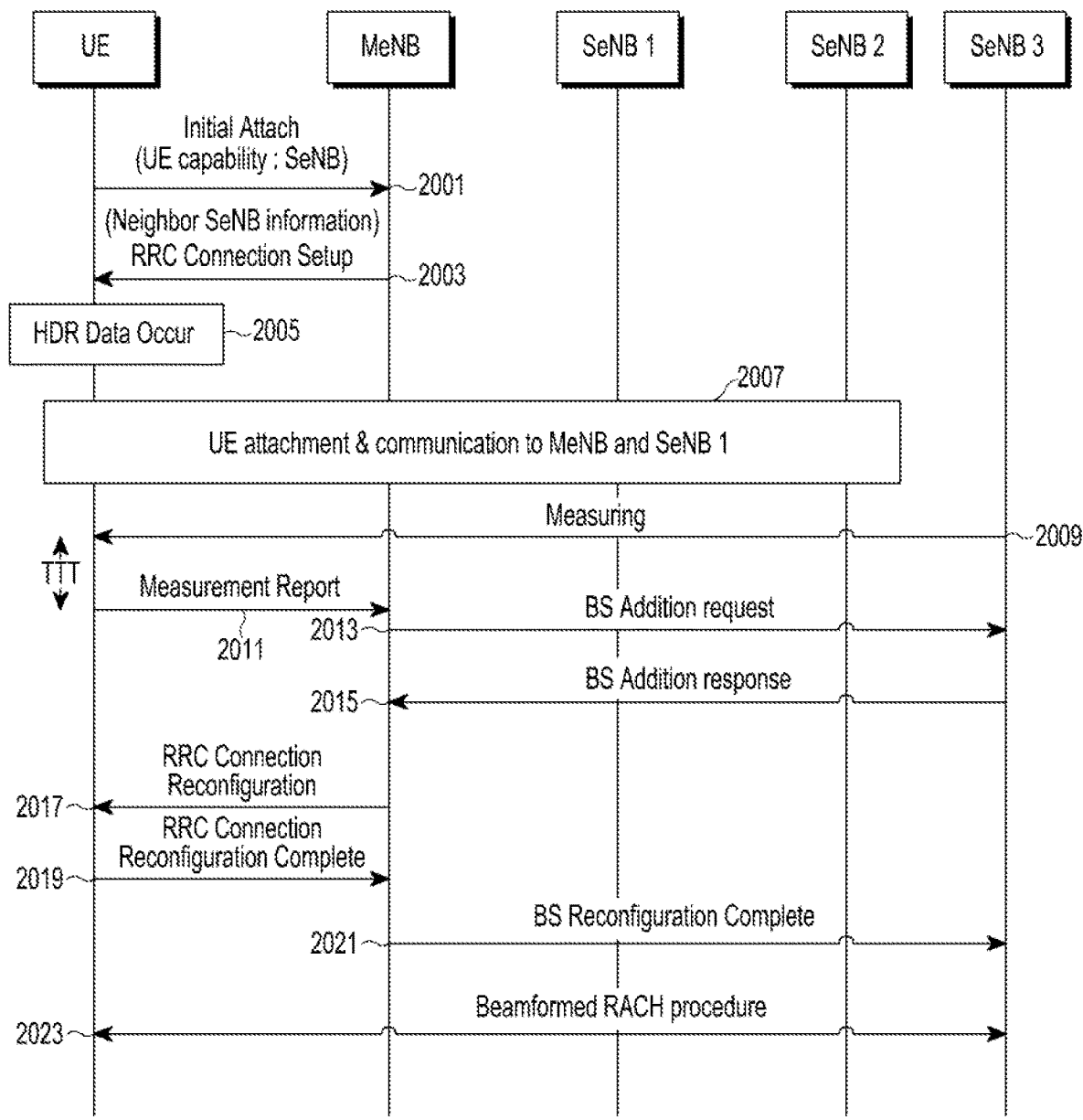
Figure 21:
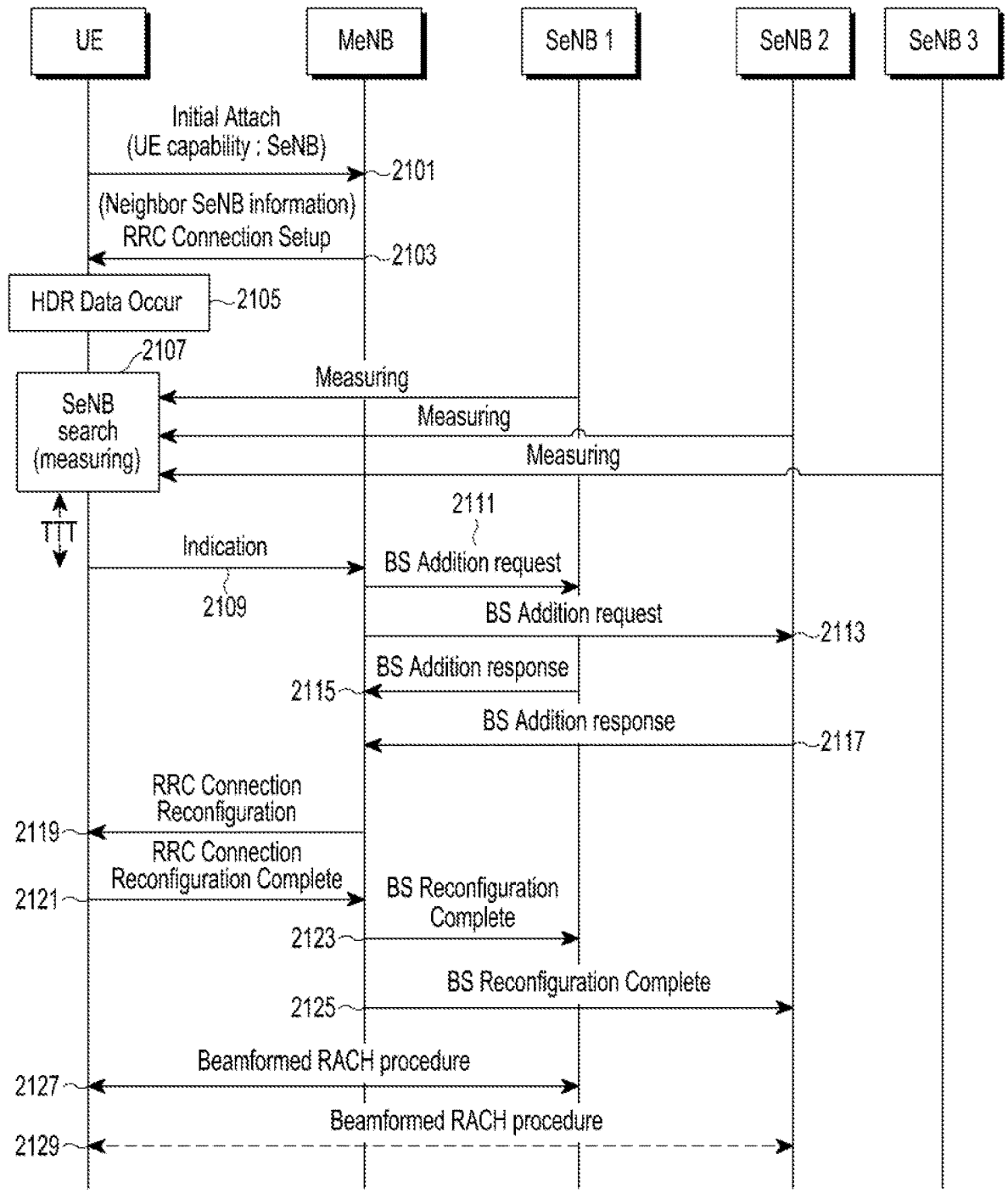

FIGS. 19 to 21 are flowcharts illustrating procedures of SeNB addition according to embodiments of the present disclosure.

FIG. 19 presents MeNB initiated SeNB selection with simultaneous attachment according to an embodiment of the present disclosure.

Referring to FIG. 19, in operation 1901, UE sends an initial attachment message to MeNB. The initial attachment message may include at least one of UE capability, SeNB information. In the event that UE has to provide a high rate data service in operation 1905, search for SeNB is done at UE for three SeNBs in operation 1907. After measuring, UE provides measurement report back to MeNB in operation 1909. In this case, UE reports SeNB1 and SeNB2 to MeNB. In this case, three SeNBs are measured and two SeNBs (SeNB1, SeNB2) are reported to the MeNB in operation 1909. The reported information is at least one of signal quality of SeNB(s), beam state information, beam index of SeNB(s). In operations 1911 and 1913, MeNB requests all possible SeNBs for addition availability. As a response to operations 1911 and 1913, MeNB receives a response message to the request in operations 1915, 1917. In operation 1918, MeNB determines possible SeNBs based on UE's measurement report (at least one of signal quality, beam state information, beam index). After receiving the positive response from SeNBs which addition requests have been transmitted to, MeNB makes information on various association levels to each SeNB. In this case the information of association level includes at least one of the set of SeNBs of which downlink and uplink UE should be synchronized to, the set of SeNBs of which either downlink or uplink UE should be synchronized to, the set of SeNBs in which UE has to do the beam training and the set of SeNBs which UE receives the data. Dedicated random access resource at SeNB can be provided in the information. Maintenance information of UE context included for SeNB can be provided in the information (e.g., including whether to maintain UE context in selecting the chosen SeNB). Then MeNB send this information to UE within RRC connection reconfiguration in operation 1919. Once UE receives this information in operation 1921, it follows this configuration and it sends back to MeNB the complete message. In operations 1923, 1925, MeNB sends BS reconfiguration completion messages to selected SeNBs. According to this preference information UE tries to attach to each SeNBs in operations 1927, 1929. The number of SeNBs which can be attached to by UE is not only 1 but the multiple SeNBs can be attached by this procedure. FIG. 20 presents MeNB initiated SeNB selection with sequential attachment.

FIG. 20 presents MeNB initiated SeNB selection with sequential attachment according to an embodiment of the present disclosure.

Compared to simultaneous attachment case above where MeNB makes and gives the attachable SeNB information to UE and UE attaches to them almost simultaneously, in the sequential attachment MeNB creates attachable SeNB information sequentially. After each transfer of the SeNB information from MeNB to UE, UE attaches to that SeNB one-by-one.

UE attaches to MeNB through an initial access procedure. MeNB gives neighbor SeNB information in RRC connection setup message. At some time, HDR data is generated. Then UE attaches to and communicates with MeNB and SeNB1 after the procedure of FIG. 19. MeNB initiates SeNB selection with simultaneous attachment. The procedure or operation 2007 is the same as in FIG. 19. MeNB initiated SeNB selection with simultaneous attachment section except that SeNB1 is the only SeNB to attach this time, for example. After some time, SeNB3 has appeared due to situation changed such as the movement of UE. Then UE measures SeNB3 in operation 2009 and reports the measurement on SeNB3 in operation 2011. In operations 2013, 2015, BS addition request and response is transferred to/from SeNB from/to MeNB respectively. Then MeNB can give the final attachable SeNB information to UE in RRC connection reconfiguration in operation 2017. The final attachable SeNB is determined based on at least one of UE's measurement report (at least one of signal quality, beam state information, beam index), resource availability at SeNB, the relationship between beam state information, beam index and SeNB. The information made from MeNB may include at least one of the set of SeNBs of which downlink and uplink UE should be synchronized to, the set of SeNBs of which either downlink or uplink UE should be synchronized to, the set of SeNBs in which UE has to do the beam training and the set of SeNBs which UE receives the data. Dedicated random access resource at SeNB can be provided in the information. Maintenance information of UE context about whether to maintain the UE context of the serving SeNB at the selected SeNB can be provided in the information. In operation 2019, UE gives RRC connection reconfiguration complete message back to MeNB. MeNB receives this complete message and sends BS reconfiguration complete message to SeNB3 in operation 2021. Then in operation 2023, UE attaches to SeNB3 using beamformed RACH.

FIG. 21 presents UE initiated SeNB selection with simultaneous attachment according to an embodiment of the present disclosure.

In this case, MeNB sends the measurement configuration information on SeNBs to UE. Then UE can measure and select appropriate SeNBs and access to SeNBs with that order.

Referring to FIG. 21, in operation 2101, UE attaches to MeNB with the information of UE capability on SeNB operation. In operation 2103, MeNB gives the neighbor SeNB information in RRC connection reconfiguration message to UE. In the event that a high rate data service needs to be provided in operation 2105, UE searches the SeNBs by measuring the SeNBs of which information is already given before, and selects the appropriate SeNBs to attach to, in operation 2107. In this case, in operation 2109, UE selects SeNB1 and SeNB2 and sends the indicator of this selection to MeNB.

The selection of SeNBs to report may be based on measurement reporting control sent by MeNB. In this case, three SeNBs are measured and two SeNBs (SeNB1, SeNB2) are reported to the MeNB. Then, MeNB requests all possible SeNBs for addition availability in operations 2111, 2113. Possible SeNBs are selected based on UE's measurement report (at least one of signal quality, beam state information, beam index) or stored information of relationship between beam state information, beam index and SeNB.

After receiving the positive response from SeNBs which addition requests have been transmitted to in operations 2115, 2117, MeNB transmits the information on the SeNBs which the positive response came from within RRC connection reconfiguration, at least one of the set of SeNBs of which downlink and uplink UE should be synchronized to, the set of SeNBs of which either downlink or uplink UE should be synchronized to, the set of SeNBs in which UE has to do the beam training and the set of SeNBs which UE receives the data etc., to UE, in operation 2119. Dedicated random access resource at SeNB can be provided in the information.

Maintenance information of UE context about whether to maintain the UE context of the serving SeNB at the SeNB can be provided in the information. In this case the related information can be variable. Once UE receives this information, it attaches to the selected SeNBs after it sends back to MeNB the complete message in operation 2121. MeNB sends BS reconfiguration completion messages to each of the selected SeNBs in operations 2123, 2125.

In this example, UE makes the attach order SeNB1 first and SeNB2 the second on its own. UE first attaches to the SeNB1 which was ranked the first or main SeNB using beamformed RACH procedure in operation 2127. And then UE can attaches to the remaining SeNB using beamformed RACH procedure in operation 2129.

Figure 22:
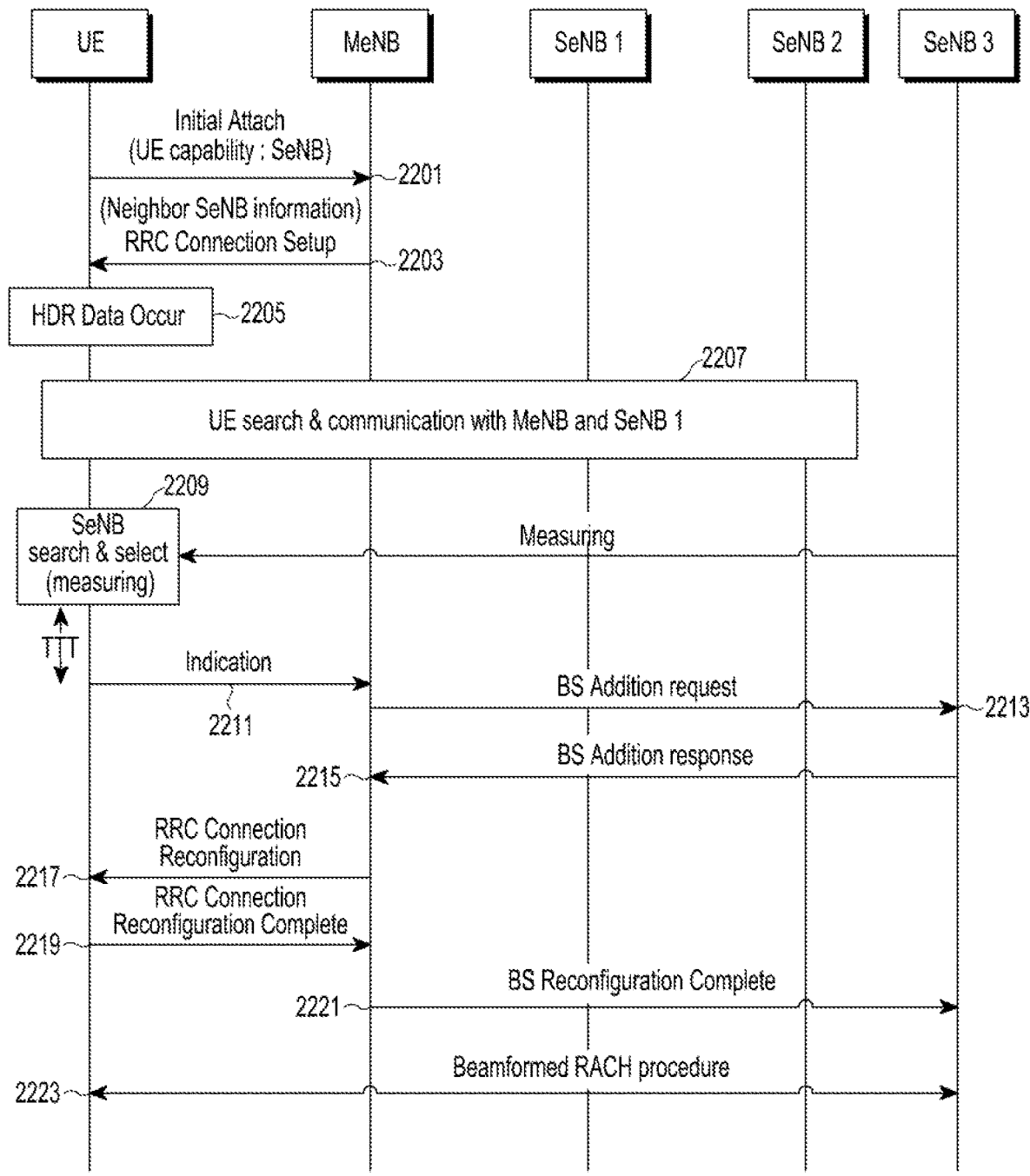

FIG. 22 presents UE initiated SeNB selection with sequential attachment according to an embodiment of the present disclosure.

Referring to FIG. 22, in operation 2201, UE perform initial attach to MeNB with UE capability of SeNB operation. In operation 2203, MeNB send RRC connection setup message including neighbor SeNB information. HDR data is generated at some time at UE, in operation 2205. Then UE searches SeNBs and communicates with MeNB and SeNB1, in operation 2207.

In FIG. 22, we assume that SeNB1 is only admitted by UE measurement report or resource availability for example. After some time, SeNB3 appears so that UE measures that SeNB3 in operation 2209. Then UE determines this SeNB as candidate to attach to in operation 2203 and UE sends indicator including the information of SeNB3 (at least one of SeNB3 identifier, beam state information, beam index, signal quality) to the MeNB in operation 2205. MeNB send BS addition request to SeNB3 in operation 2213 and SeNB3 sends back the response to the MeNB in operation 2215.

MeNB finally gives the attachable SeNB which is SeNB3 in this example in the RRC connection reconfiguration message to UE in operation 2217. Attachable SeNB decision is based on at least one or more of resource availability, signal quality, beam state information, beam index, relationship between beam state information, beam index and SeNB. Dedicated random access resource at SeNB3 can be provided. An indication for UE context maintenance, which provides information about whether to maintain UE context may be provided.

In operation 2219, UE sends back the complete message in the RRC connection reconfiguration complete message to MeNB. In operation 2221, MeNB sends BS reconfiguration complete message to SeNB3 for indicating that there will be a rach procedure.

Then UE attaches to SeNB3 using beamformed RACH procedure in operation 2223. In the first search and attachment procedure, there is no limit of the number of attaching SeNBs and of course the next attachment procedure also has no limit on this.

Figure 23:
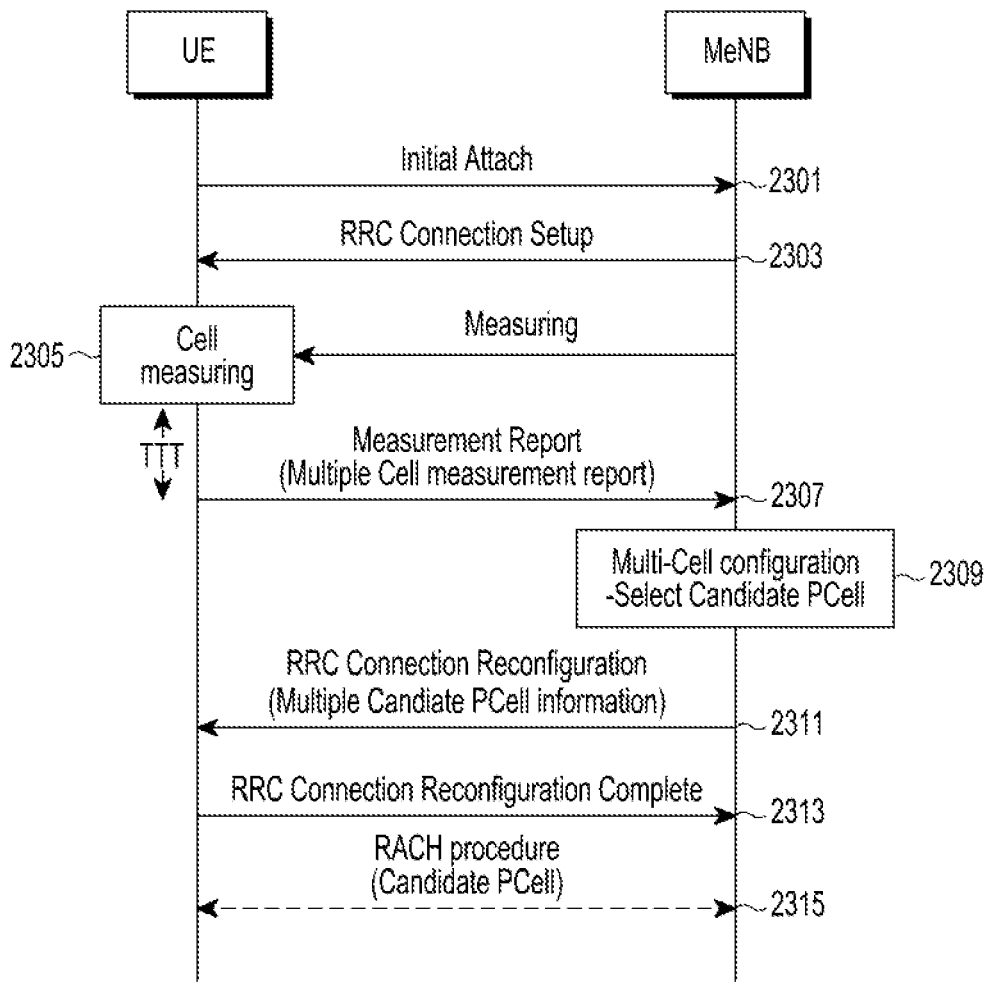

FIG. 23 presents MeNB initiated multiple PCell set configuration according to an embodiment of the present disclosure.

Referring to FIG. 23, in operation 2301, UE performs initial connection to MeNB. MeNB sends an RRC connection reconfiguration message including information of neighboring SeNBs, in operation 2303.

In operation 2305, the UE measures cells in MeNB. After measuring, UE provides the measurement report back to MeNB in operation 2307. In this case, multiple cells are measured. And MeNB determines which cell can be selected for candidate PCell in operation 2309. The candidate PCell is defined as the cell which has a similar context as PCell for a UE but candidate PCell may not air signaling with UE until candidate PCell is changed to serving PCell. Then, MeNB creates information on various association levels to several candidate PCells.

In this case, the information of association level may include at least one of the set of candidate PCells of which UE should be synchronized to in uplink or downlink, the set of candidate PCells of which either downlink or uplink UE should be synchronized to. Then MeNB send this information to UE through RRC connection reconfiguration in operation 2311.

Once UE receives this information it follows this configuration and it sends back to MeNB the complete message in operation 2313. According to this preference information UE gets 1 or more candidate PCells which can serve as new PCell when currently serving PCell has become unable to serve the UE.

The UE may perform RACH procedure to be synchronized with the added candidate PCells in operation 2315. If the signal quality of current PCell meets a condition to change PCell, (e.g., the signal quality of current PCell is less than one of candidate PCells), the UE performs PCell change from current PCell to one of candidate PCells without RRC signaling transaction. In this case, the UE immediately may perform a random access procedure to synchronize a new PCell, if need.

Figure 24:
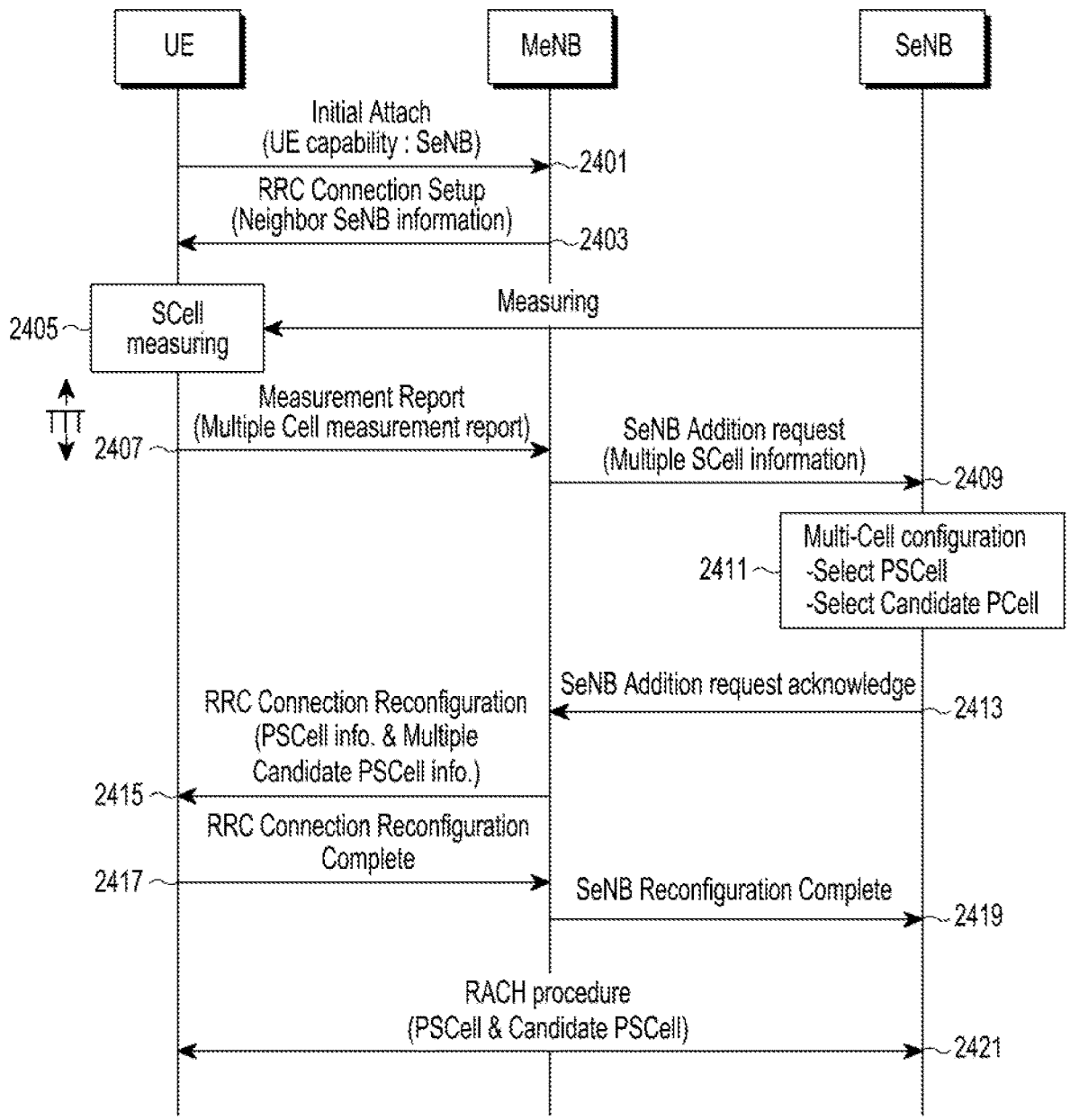

FIG. 24 presents MeNB initiated multiple PSCell set configuration according to an embodiment of the present disclosure.

Referring to FIG. 24, UE performs initial connection to MeNB through UE capability of SeNB operation, in operation 2401. MeNB sends an RRC connection reconfiguration message including information of neighboring SeNBs, in operation 2403.

In operation 2405, search for secondary cell (SCell) is done at UE for a SeNB. After measuring, UE provides the measurement report back to MeNB in operation 2407. In this case, UE sends measurement reports about multiple SCells to MeNB. And MeNB sends SeNB addition request message including Multiple SCell information to a SeNB in operation 2409. The measurement report may include signal quality, beam state information, beam index, etc. Then, SeNB determines whether notified cells can be selected or not as candidate primary secondary cell (PSCell), in operation 2411.

The candidate PSCell is defined as the cell which has the same or similar context as PSCell for a UE but candidate PSCell does not do air signaling with UE until candidate PSCell is changed to PSCell. After deciding, the SeNB sends SeNB addition request acknowledge message to MeNB in operation 2413. After receiving the positive response from SeNB which addition requests have been transmitted to, MeNB creates information on various association levels to each cell.

In this case the information of association level may include at least one of the set of candidate PSCells of which UE should be synchronized to in downlink and uplink, the set of candidate PSCells of which either UE should be synchronized to in downlink or uplink, the beam-forming information of the set of candidate PSCells. Dedicated random access resources for the set of candidate PSCells can be provided. Then MeNB send this information to UE through RRC connection reconfiguration, in operation 2415. Once UE receives this information it follows this configuration and it sends back to MeNB the complete message in operation 2417. MeNB sends SeNB reconfiguration completion messages to a SeNB in operation 2419.

According to the preference information UE gets 1 or more candidate PSCell which can serve as new PSCell when currently serving PSCell has become unable to serve the UE. The UE may perform RACH procedure to be synchronized with the added candidate PSCells in operation 2421.

Also, the UE can send measurement report about multiple SeNBs to MeNB as described from FIGS. 19 to 22 procedures. In this case, each SeNB has one PSCell, several candidate PSCells and this information should be sent to UE via MeNB. In this case, MeNB may select serving SeNB among several SeNBs based on at least one of UE's measurement report, resource availability at SeNBs, stored information of relationship between beam state information, beam index and SeNB as described procedures of FIGS. 19 to 22.

If the signal quality of current PSCell meets a condition to change PSCell, (e.g., the signal quality of current PSCell is less than one of candidate PSCells), the UE performs PSCell change from current PSCell to one of candidate PSCells without RRC signaling transaction. In this case, the UE may perform a random access procedure to synchronize a new PSCell, if need.

Figure 25:
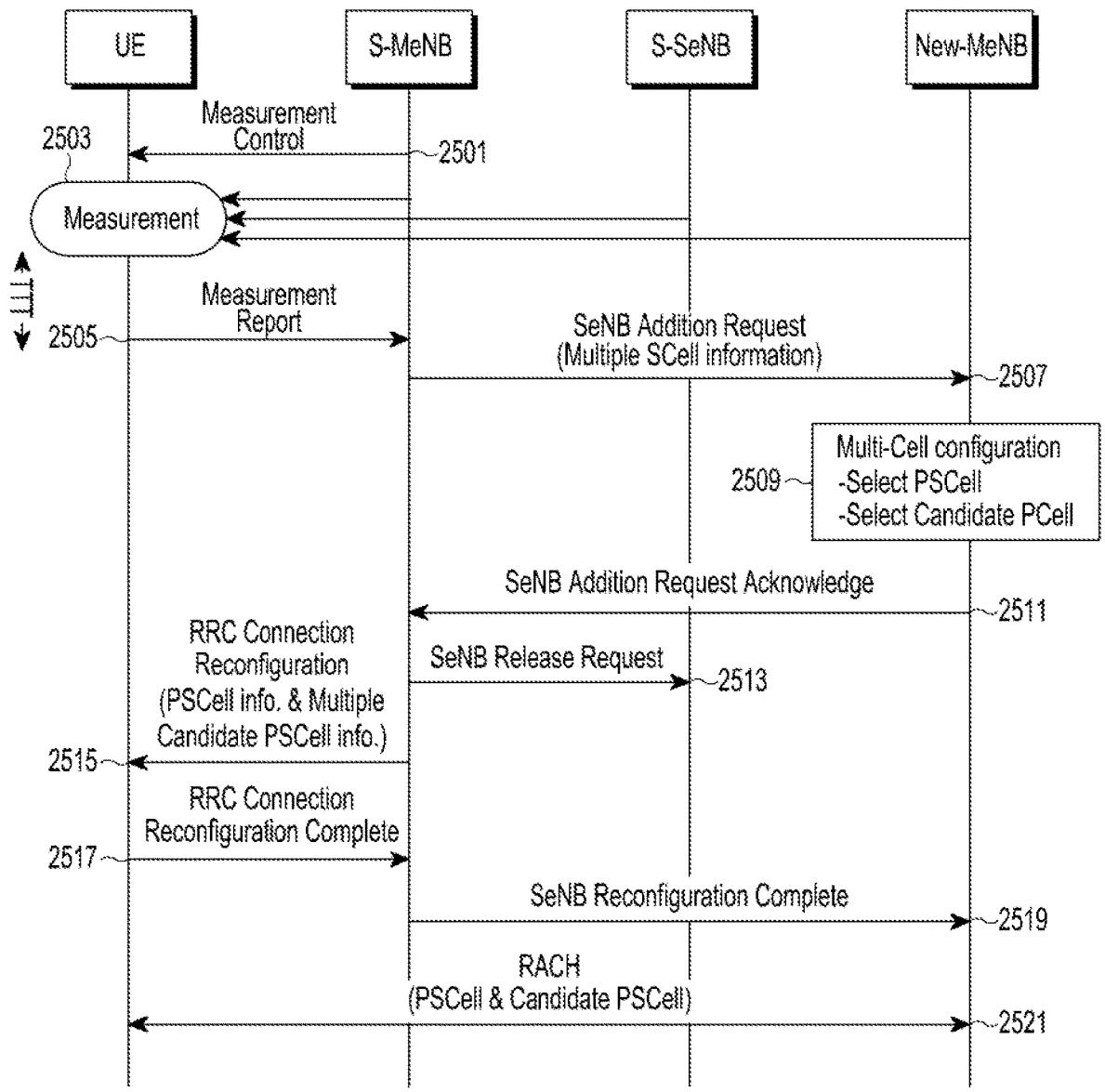

FIG. 25 presents MeNB initiated multiple PCell set configuration during SeNB change according to an embodiment of the present disclosure.

Referring to FIG. 25, in this case, search for SCell is done at UE for a new SeNB. The measurement control of operation 2501 is similar to that of operation 201 shown in FIG. 2. After measuring in operation 2503, UE provides the measurement report back to MeNB in operation 2505. In this case, UE sends measurement reports about multiple SCells related with new SeNB to MeNB. The measurement reports may include at least one of signal quality of SCells, beam state information, beam index of SCells. In operation 2507, MeNB sends SeNB addition request message including Multiple SCell information to a new SeNB. Then, in operation 2509, new SeNB determines whether notified cells can be selected or not for candidate PSCell as well as PScell based on at least one of resource availability of SCells, UE's measurement of SCells, relationship between beam state information, beam index and SCell. The candidate PSCell is defined as the cell which has the same or similar context as PSCell for a UE but candidate PSCell may not do air signaling with UE until candidate PSCell is changed to PSCell.

After deciding, the new SeNB sends SeNB addition request acknowledge message to MeNB in operation 2511. MeNB sends an SeNB release request message to S-SeNB, in operation 2513. After receiving the positive response from SeNB which addition requests have been transmitted to, MeNB creates information on various association levels to each Cell, in operation 2513.

In this case the information of association level can include at least one of the set of candidate PSCells of which UE should be synchronized to in downlink and uplink, the set of candidate PSCells of which either UE should be synchronized to in downlink or uplink, dedicated random access resources of the set of candidate PSCells. Then MeNB send this information to UE through RRC connection reconfiguration in operation 2515. Once UE receives this information it follows this configuration and it sends back to MeNB the RRC connection reconfiguration complete message, in operation 2517.

MeNB sends SeNB reconfiguration completion messages to a new SeNB in operation 2519. According to this preference information UE gets 1 or more candidate PSCells for the new SeNB, which can serve as new PSCell when current PSCell has become unable to serve the UE. The UE may perform RACH procedure to be synchronized with the added candidate PSCells as well as PSCell, in operation 2521.

Also, the UE can send measurement report about multiple new SeNBs to MeNB as described procedures of FIG. 19 to FIG. 22. In this case, each new SeNB has one PSCell, several candidate PSCells and this information may be sent to UE via MeNB. In this case, MeNB may select serving new SeNB among several new SeNBs as described procedures of FIGS. 19 to 22.

If the signal quality of current PSCell meets a condition to change PSCell, (e.g., the signal quality of current PSCell is less than one of candidate PSCells), the UE performs PSCell change from current PSCell to one of candidate PSCells without RRC signaling transaction. In this case, the UE may perform a random access procedure to synchronize a new PSCell, if need.

Figure 26:
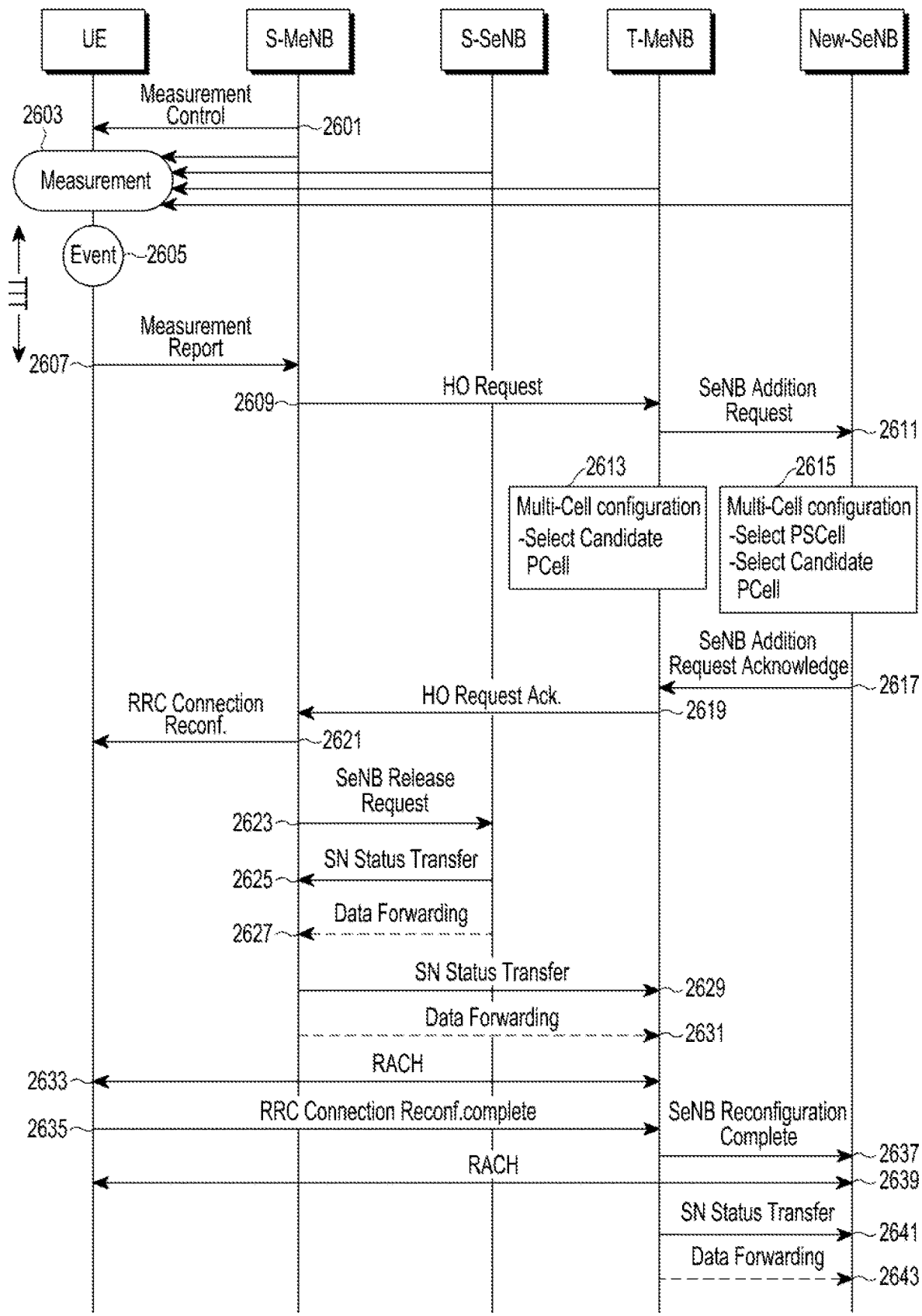

FIG. 26 presents MeNB initiated multiple PCell set and PSCell set configuration during MeNB change according to an embodiment of the present disclosure.

Referring to FIG. 26, in this case, when a UE performs a MeNB handover, the UE also makes SeNB change. The UE may measure various cells about a serving MeNB, target MeNB, serving SeNB and target SeNB, in operation 2603. If the UE wants MeNB handover in operation 2605, the UE provides measurement information about multiple Cells for target MeNB as well as multiple SCells for target SeNB to a target MeNB, in operation 2607. Measurement condition or measurement reporting condition for SeNB can be different from for MeNB. A value of TTT is set to '0' or more.

The serving MeNB sends an HO request message to the target MeNB in operation 2609, and the target MeNB sends an SeNB addition request message to the new S-eNB in operation 2611. An HO Request Ack message in response to the HO request message in operation 2609 may be optionally processed in operation 2619. With the measurement information about multiple Cells, target MeNB determines which cell can be selected for PCell and candidate PCell in operation 2613. The candidate PCell may be indicated as the cell which has the same or similar context as PCell for a UE but candidate PCell may not do air signaling with UE until candidate PCell is changed to serving PCell. Then, target MeNB creates information on various association levels to several candidate PCells in operation 2613.

In this case the information of association level may include at least one of the set of candidate PCells of which downlink and uplink UE should be synchronized to, the set of candidate PCells of which either UE should be synchronized to in downlink or uplink. Also, target MeNB transfers measurement information reported by UE about multiple SCells for target SeNB. The measurement information includes at least one of signal quality, beam state information, beam index. Then, in operation 2615, target SeNB determines whether notified cells can be selected or not for PSCell and candidate PSCell based on at least one of the measurement information, resource availability of cells in target SeNB, stored information of relationship between beam state information, beam index and cells in target SeNB. The candidate PSCell may be indicated as the cell which has the same or a similar context as PSCell for a UE but candidate PSCell may not do air signaling with UE until candidate PSCell is changed to PSCell. After deciding, target SeNB sends SeNB addition request acknowledge message to target MeNB in operation 2617.

The SeNB addition request acknowledge message can include dedicated random access resources of selected cells at target SeNB. After receiving the positive response from target SeNB which addition requests have been transmitted to, target MeNB creates information on various association levels to each SCell. In this case the information of association level may include at least one of the set of candidate PSCells of which UE should be synchronized to in downlink and uplink, the set of candidate PSCells of which either UE should be synchronized to in downlink and uplink, beamforming information of the set of candidate PSCells, dedicated random access resource of the set of candidate PSCells which resource is determined based on beam state information, beam index.

Then target MeNB send this information to serving MeNB and the MeNB transmits this information to UE through RRC connection reconfiguration in operation 2621. Once UE receives this information it follows this configuration and it sends back to MeNB the RRC connection reconfiguration complete message. According to this preference information UE tries to attach to PCell and PScell, and the UE gets 1 or more candidate PCells, and 1 or more candidate PSCells. The candidate PCell can serve as new PCell when current PCell has become unable to serve the UE. The candidate PScell can serve as new PScell when current PScell has become unable to serve the UE. In operations 2633, 2639, the UE may perform RACH procedure to be synchronized with the added candidate PSCells and the added candidate PCells.

Also, the UE can send measurement report about multiple new SeNBs to MeNB as described procedures of FIGS. 19 to 22. In this case, each new SeNB has one PSCell, several candidate PSCells and this information should be sent to UE via MeNB. In this case, MeNB may select new serving SeNB among several new SeNBs as described procedures in FIGS. 19 to 22. If the signal quality of current PCell meets a condition to change PCell, (e.g., the signal quality of current PCell is less than one of candidate PCells), the UE may perform PCell change from current PCell to one of candidate PCells without RRC signaling transaction.

In this case, the UE may perform a random access procedure to synchronize a new PCell, if need. In similar way PScell change from current PScell to one of candidate PScells may be performed without RRC signaling transaction if PSCell change condition is met. A condition to change PSCell can be different from that of PCell and it may be applied to beam index of PSCell.

In an embodiment of the present disclosure, MeNB manages a serving cell and a list of candidate cells based on the measurement report from the UE, and a candidate cell may be selected for a cell to which the UE is able to hand over. In this regard, handover triggering conditions and the cell list may be determined by the serving cell.

Furthermore, once handover is determined, the UE performs inter-cell resource fetching and path switching. In this regard, the UE may send an indicator to indicate that the handover is caused from a link drop, to MeNB.

Meanwhile, additional conditions in which the UE may perform fast handover to a candidate cell in accordance with an embodiment of the present disclosure may be one of the followings:

Dedicated RACH preamble resources are operated, and for the dedicated RACH preamble resources, preamble valid timer may be operated;

RACH transmit beam information or transmit/receive beam information on the candidate cell is secured in advance in determining the candidate cell;

UE context that has been used in the serving cell is used intact without release/reconfiguration of the UE context, and a context maintenance indicator is operated;

In determining a candidate cell, beam index and beam state information for candidate cells stored in serving cell are used.

Figure 27:
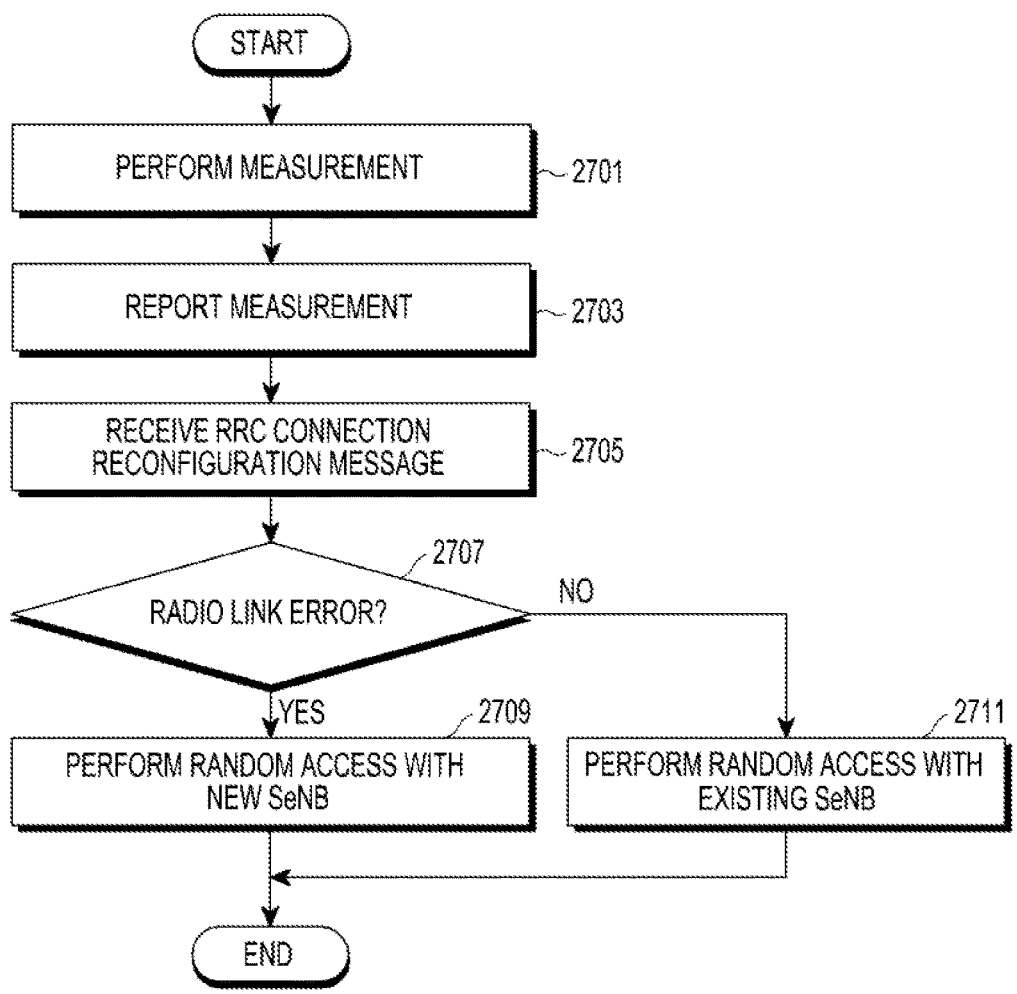
FIG. 27 is a flowchart of operation of UE in a wireless communication system according to an embodiment of the present disclosure.

FIG. 27 is a flowchart of operation of UE in a wireless communication system according to an embodiment of the present disclosure.

Referring to FIG. 27, the UE measures a serving cell and neighboring cells, in operation 2701.

The UE sends a measurement report message that reflects the measurement results to MeNB or SeNB, in operation 2703.

The UE then receives an RRC connection reconfiguration message from MeNB or SeNB, in operation 2705. The RRC connection reconfiguration message includes a list of candidate cells including cell IDs.

In an embodiment, the UE determines whether a wireless link failure (or handover) (or signal error) has occurred in SeNB, in operation 2707. If a wireless link failure has occurred in SeNB, the UE performs a random access procedure with a new SeNB, in operation 2709. Information required to perform the random access procedure with the new SeNB is obtained from MeNB or SeNB.

In an embodiment, UE may determine whether a wireless link failure (or handover) (or signal error) with MeNB, in operation 2707. If a wireless link failure has occurred with MeNB, the UE performs a random access procedure with a new MeNB, in operation 2709. Information required to perform the random access procedure with the new MeNB may be obtained from MeNB or SeNB.

In another embodiment, if any wireless link failure has not occurred in MeNB or SeNB, the UE performs the random access procedure with the existing SeNB, in operation 2711.

Operations 2701 to 2711 of UE as shown in FIG. 27 are only by way of examples, and the UE accesses MeNB or SeNB and performs a handover procedure according to what are described in FIGS. 1 to 3, 4A, 4B, 4C, 5 to 14, 15A, 15B, and 16 to 26.

Figure 28:
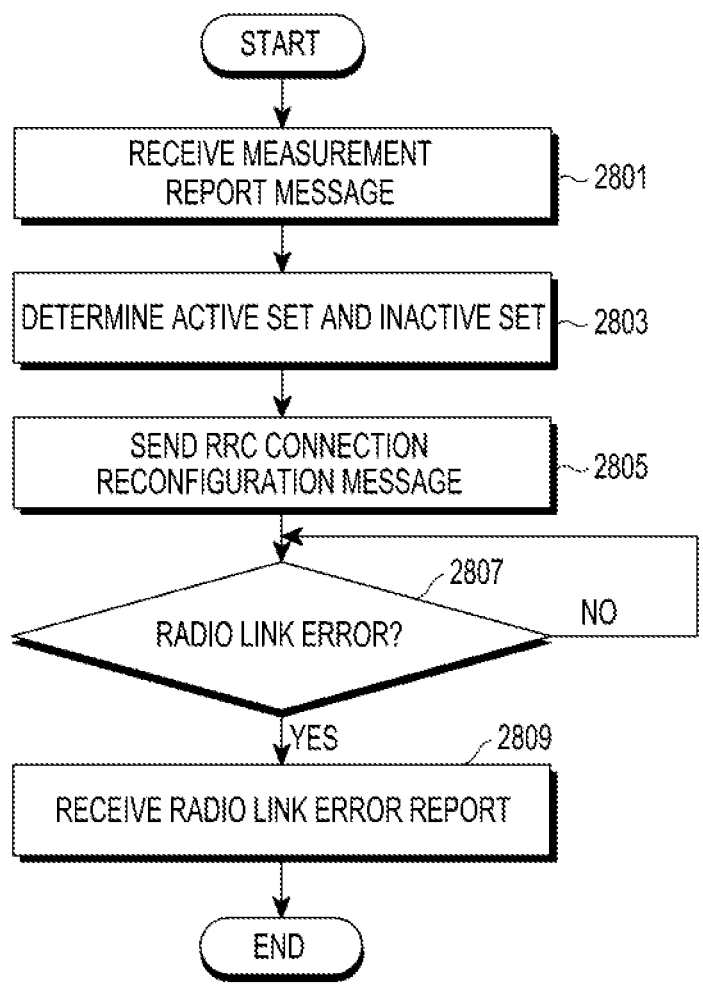
FIG. 28 is a flowchart of operation of MeNB in a wireless communication system according to an embodiment of the present disclosure.

FIG. 28 is a flowchart of operation of MeNB in a wireless communication system according to an embodiment of the present disclosure.

In operation 2801, MeNB receives a measurement report message based on measurement results from the UE.

In operation 2803, MeNB determines active inactive sets based on the measurement report message.

In operation 2805, MeNB sends an RRC connection reconfiguration message including at least one of the active and inactive sets to the UE. In an embodiment, MeNB may provide various information for the UE to perform the random access procedure.

In operation 2807, MeNB determines whether a wireless link failure or signal quality drop has occurred in SeNB. If a wireless link failure or signal quality drop has occurred in SeNB, MeNB receives a signal error report message from the UE, in operation 2809.

Operations 2801 to 2809 of MeNB as shown in FIG. 28 are only by way of examples, and the MeNB accesses the UE and supports handover with multi-connectivity according to what are described in FIGS. 1 to 3, 4A, 4B, 4C, 5 to 14, 15A, 15B, and 16 to 26.

Figure 29:
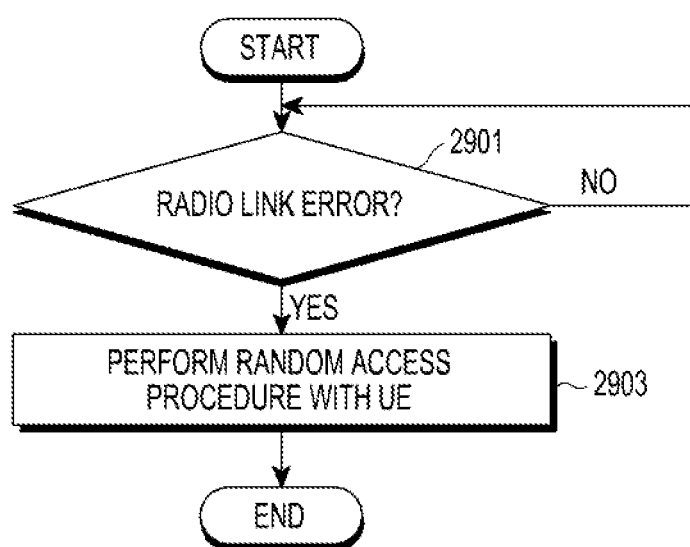
FIG. 29 is a flowchart of operation of SeNB in a wireless communication system according to an embodiment of the present disclosure.

FIG. 29 is a flowchart of operation of SeNB in a wireless communication system according to an embodiment of the present disclosure.

Referring to FIG. 29, in operation 2901, SeNB determines whether a wireless link failure or signal quality drop has occurred in the SeNB. If a wireless link failure or signal quality drop has occurred in the SeNB, the SeNB performs a random access procedure with the UE, in operation 2903.

Operations 2901 to 2903 of SeNB as shown in FIG. 29 are only by way of examples, and the SeNB accesses the UE and supports handover with multi-connectivity according to what are described in FIGS. 1 to 26.

Figure 30:
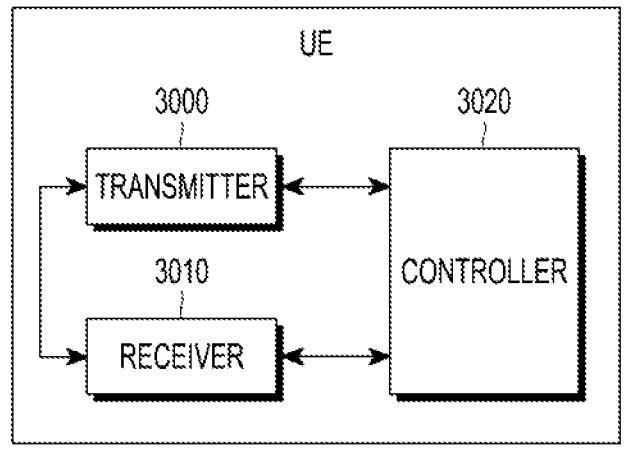
FIG. 30 is a block diagram of a UE in a wireless communication system according to an embodiment of the present disclosure.

FIG. 30 is a block diagram of a UE in a wireless communication system according to an embodiment of the present disclosure.

Referring to FIG. 30, a UE includes a transmitter 3000, a receiver 3010, and a controller 3020. The controller 3020 includes at least one processor.

The transmitter 3000 and the receiver 3010 include a transmitting module and a receiving module for transmitting and receiving data to and from a base station, respectively, according to an embodiment of the present disclosure.

The controller 3020 accesses an MeNB or an SeNB and performs a handover procedure, according to what are described in connection with FIGS. 1 to 4C, 5 to 15B, and 16 to 26.

The controller 3020 obtains candidate SeNBs in advance using measurement by the MeNB in preparation for a possible situation (e.g., signal quality drop) in which a problem arises in radio link with the S-SeNB. If the problem arises in the radio link with the S-SeNB, the controller 3020 switches to a new S-SeNB among the candidate SenBs.

Figure 31:
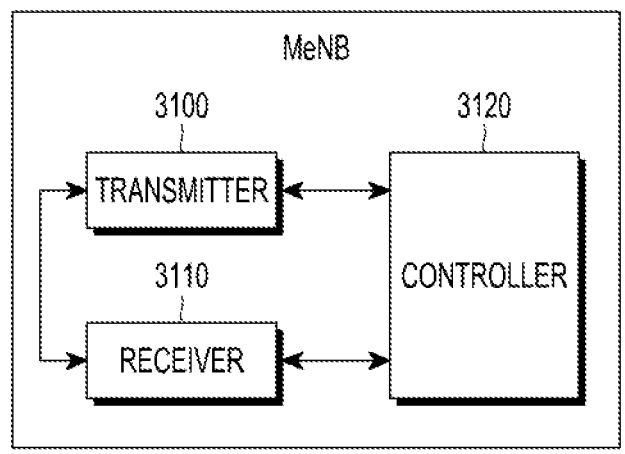
FIG. 31 is a block diagram of an MeNB in a wireless communication system according to an embodiment of the present disclosure.

FIG. 31 is a block diagram of an MeNB in a wireless communication system according to an embodiment of the present disclosure.

Referring to FIG. 31, an MeNB includes a transmitter 3100, a receiver 3110, and a controller 3120.

The transmitter 3100 and the receiver 3110 include a transmitting module and a receiving module for transmitting and receiving data to and from a UE, respectively, according to an embodiment of the present disclosure.

The controller 3120 accesses the UE and supports handover with multi-connectivity, according to what are described in connection with FIGS. 1 to 3, 4A, 4B, 4C, 5 to 14, 15A, 15B, and 16 to 26.

When receiving an indicator of switching of UE to another SeNB, the controller 3120 informs a serving SeNB and a newly selected SeNB of the UE's handover. A procedure of fetching the UE's context may be performed between the MeNB and the serving SeNB or the newly selected SeNB, if necessary. A procedure of path switching via the newly selected SeNB may be performed for the UE, if necessary. The controller 3120 informs other SeNB(s) except for the target SeNB to release resources reserved for the UE's switching, or the UE's context.

Figure 32:
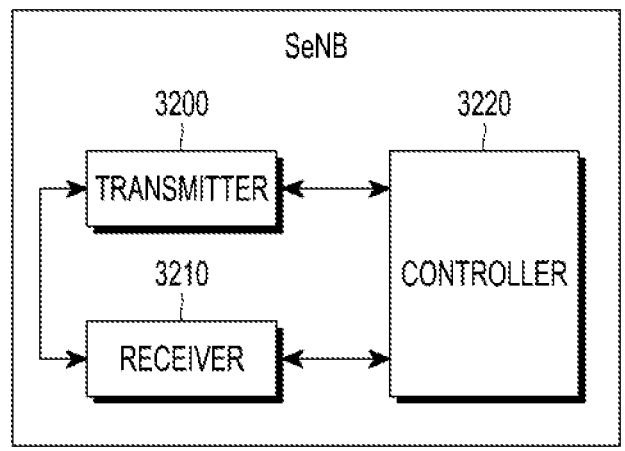
FIG. 32 is a block diagram of an SeNB in a wireless communication system according to an embodiment of the present disclosure.

FIG. 32 is a block diagram of an SeNB in a wireless communication system according to an embodiment of the present disclosure.

Referring to FIG. 32, an SeNB includes a transmitter 3200, a receiver 3210, and a controller 3220.

The transmitter 3200 and the receiver 3210 include a transmitting module and a receiving module for transmitting and receiving data to and from a UE, respectively, according to an embodiment of the present disclosure.

The controller 3220 accesses the UE and supports handover with multi-connectivity, according to what are described in connection with FIGS. 1 to 3, 4A, 4B, 4C, 5 to 14, 15A, 15B, and 16 to 26.

It should be noted that the illustrations, signal flow charts, block diagrams, etc. as shown in FIGS. 1 to 3, 4A, 4B, 4C, 5 to 14, 15A, 15B, and 16 to 26 are not intended to limit the scope of the present disclosure. Thus, all the information, fields, components, or operations in connection with FIGS. 1 to 3, 4A, 4B, 4C, 5 to 14, 15A, 15B, and 16 to 26 should not be interpreted as essential elements for practicing the present disclosure, and the present disclosure may be implemented only with a part of the components or operations within the scope of the present disclosure.

The aforementioned operations may be implemented by a memory device storing the corresponding program codes equipped in an entity, a function, a base station of a communication system, or an arbitrary part in a vehicle. A controller of the entity, function, base station, UE, or vehicle may execute the aforementioned operations by having a processor or central processing unit (CPU) read out and process the program codes stored in the memory device.

The aforementioned entities, functions, base stations (eNBs), UEs, or various parts of vehicle, modules, etc., may be implemented in hardware, e.g., complementary metal oxide semiconductor based logic circuits, firmware, software, and/or a combination of hardware, firmware and/or machine-readable software. For example, various electric structures and methods may be implemented with electric circuits, such as transistors, logic gates, application-specific integrated circuits (ASICs), etc.

While the present disclosure has been shown and described with reference to various embodiments thereof, it will be understood by those skilled in the art that various changes in form and details may be made therein without departing from the spirit and scope of the present disclosures defined by the appended claims and their equivalents.

What is claimed is:

1. A method for supporting handover of a user equipment (UE) in a wireless communication system, the method comprising:
    receiving, from a serving cell, a radio resource control (RRC) message;
    identifying whether the RRC message includes a conditional handover configuration, wherein the conditional handover configuration includes first information on at least one target candidate cell and second information on condition of conditional handover execution;
    in case that the RRC message includes the conditional handover configuration, determining whether a link quality value of the serving cell is lower than a first threshold associated with the second information and a link quality value of at least one cell among the at least one target candidate cell is higher than a second threshold associated with the second information;
    selecting the at least one cell among the at least one target candidate cell as a target cell in response to the determination that the link quality value of the serving cell is lower than the first threshold associated with the second information and the link quality value of the at least one cell among the at least one target candidate cell is higher than the second threshold associated with the second information; and
    performing handover to the target cell.

2. The method of claim 1, wherein the second information is associated with the first information.

3. The method of claim 1, the performing comprising:
    performing a random access procedure with the target cell.

4. The method of claim 1, further comprising:
    receiving, from the serving cell, information related to a measurement configuration; and
    performing measurement on the serving cell and other cell based on the information related to the measurement configuration.

5. The method of claim 4, further comprising: transmitting, to the serving cell, a measurement report message including information related to at least one of the serving cell or the other cell.

6. A user equipment (UE) for supporting handover in a wireless communication system, the UE comprising:
    a transceiver; and
    a controller configured to control the transceiver,
    wherein the controller is configured to:
        receive, from a serving cell, a radio resource control (RRC) message,
        identifying whether the RRC message includes a conditional handover configuration, wherein the conditional handover configuration includes first information on at least one target candidate cell and second information on condition of conditional handover execution,
        in case that the RRC message includes the conditional handover configuration, determine whether a link quality value of the serving cell is lower than a first threshold associated with the second information and a link quality value of at least one cell among the at least one target candidate cell is higher than a second threshold associated with the second information,
        select the at least one cell among the at least one target candidate cell as a target cell in response to the determination that the link quality value of the serving cell is lower than the first threshold associated with the second information and the link quality value of the at least one cell among the at least one target candidate cell is higher than the second threshold associated with the second information, and
        perform handover to the target cell.

7. The UE of claim 6, wherein the second information is associated with the first information.

8. The UE of claim 6, wherein the controller is further configured to:
    perform a random access procedure with the target cell.

9. The UE of claim 6, wherein the controller is further configured to:
    control the transceiver to receive, from the serving cell, information related to a measurement configuration, and
    perform measurement on the serving cell and other cell based on the information related to the measurement configuration.

10. The UE of claim 9, wherein the controller is further configured to:
    control the transceiver to transmit, to the serving cell, a measurement report message including information related to at least one of the serving cell or the other cell.

* * * * *